United States Patent
Park et al.

(10) Patent No.: US 9,442,687 B2
(45) Date of Patent: Sep. 13, 2016

(54) METHOD AND APPARATUS FOR MOVING WEB OBJECT BASED ON INTENT

(71) Applicant: Korea Advanced Institute of Science and Technology, Daejeon (KR)

(72) Inventors: Hyo Jin Park, Daejeon (KR); Jun Kyun Choi, Daejeon (KR); Jin Hong Yang, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 282 days.

(21) Appl. No.: 13/624,140

(22) Filed: Sep. 21, 2012

(65) Prior Publication Data

US 2014/0025725 A1    Jan. 23, 2014

(30) Foreign Application Priority Data

Jul. 23, 2012  (KR) .................. 10-2012-0080074
Jul. 23, 2012  (KR) .................. 10-2012-0080075
Jul. 23, 2012  (KR) .................. 10-2012-0080077

(51) Int. Cl.
  *G06F 3/14*       (2006.01)
  *G06F 9/54*       (2006.01)
  *G06F 17/30*      (2006.01)

(52) U.S. Cl.
  CPC ........... *G06F 3/1454* (2013.01); *G06F 3/1423* (2013.01); *G06F 9/54* (2013.01); *G06F 17/30873* (2013.01); *G06F 2209/545* (2013.01); *G09G 2370/022* (2013.01)

(58) Field of Classification Search
  CPC ................ H04N 2201/3249; G06F 3/0481; G06F 3/1454
  USPC ........................................................ 709/203
  See application file for complete search history.

(56) References Cited

U.S. PATENT DOCUMENTS 5,701,400 A *  12/1997  Amado .................... 706/45
6,411,725 B1 *  6/2002  Rhoads .................. 382/100
6,792,607 B1 *  9/2004  Burd ............. G06F 17/30893
                                          707/999.102
6,813,039 B1 * 11/2004  Silverbrook et al. ..... 358/1.18
6,968,511 B1 * 11/2005  Robertson et al. ......... 715/835

(Continued)

FOREIGN PATENT DOCUMENTS

KR    10-1068598 B1    9/2011
KR    2012-0079416 A   7/2012

OTHER PUBLICATIONS

Buyukkokten et al., "Power Browser: Efficient Web Browsing for PDAs", 2000.*

(Continued)

*Primary Examiner* — O. C. Vostal
(74) *Attorney, Agent, or Firm* — Marshall, Gerstein & Borun LLP

(57) ABSTRACT

A method and apparatus for moving a web object based on an intent is provided. A primary device may identify a web object supporting movability on a loaded web page, and may determine whether the identified web object can be moved to a secondary device based on movability information of the identified web object. The primary device may re-render the web page in a web browser, aside from the web object supporting movability, while maintaining a full layout of the web page. In the movement of the web object, the primary device may push, to a push server, movement of the web object to the secondary device.

17 Claims, 23 Drawing Sheets

(56) References Cited

U.S. PATENT DOCUMENTS

| | | | |
|---|---|---|---|
| 7,054,818 B2* | 5/2006 | Sharma et al. | 704/270 |
| 7,401,118 B1* | 7/2008 | Yokota et al. | 709/203 |
| 7,630,986 B1* | 12/2009 | Herz | G06Q 10/10 |
| 7,640,512 B1* | 12/2009 | Appling | 715/771 |
| 7,761,500 B1* | 7/2010 | Eckert et al. | 709/203 |
| 7,953,777 B2* | 5/2011 | White | G06F 17/30029 |
| | | | 707/913 |
| 8,156,205 B1* | 4/2012 | Forsberg | G06F 17/30905 |
| | | | 707/634 |
| 8,239,501 B1* | 8/2012 | Forsberg | G06F 17/30905 |
| | | | 709/203 |
| 8,312,131 B2* | 11/2012 | Vasudevan | 709/224 |
| 8,413,061 B2* | 4/2013 | Sawant | 715/753 |
| 8,543,675 B1 | 9/2013 | Yiu et al. | |
| 8,615,708 B1* | 12/2013 | Hidayat et al. | 715/236 |
| 2002/0004846 A1* | 1/2002 | Garcia-Luna-Aceves et al. | 709/245 |
| 2002/0078253 A1* | 6/2002 | Szondy | G06F 17/30905 |
| | | | 719/315 |
| 2002/0147840 A1* | 10/2002 | Mutton et al. | 709/239 |
| 2002/0174191 A1* | 11/2002 | Robertson | G06Q 10/06311 |
| | | | 709/217 |
| 2002/0184351 A1* | 12/2002 | Istvan | H04L 41/0803 |
| | | | 709/222 |
| 2003/0177175 A1* | 9/2003 | Worley | G06F 17/30902 |
| | | | 709/203 |
| 2004/0181796 A1* | 9/2004 | Fedotov et al. | 719/323 |
| 2004/0201628 A1* | 10/2004 | Johanson et al. | 345/764 |
| 2005/0188051 A1* | 8/2005 | Sneh | G06F 17/243 |
| | | | 709/213 |
| 2006/0031282 A1* | 2/2006 | Tuttle et al. | 709/203 |
| 2007/0061700 A1* | 3/2007 | Kothari et al. | 715/505 |
| 2007/0234195 A1* | 10/2007 | Wells | 715/501.1 |
| 2007/0239848 A1* | 10/2007 | Avery | 709/217 |
| 2007/0244990 A1* | 10/2007 | Wells | 709/218 |
| 2007/0279521 A1* | 12/2007 | Cohen | 348/376 |
| 2008/0052140 A1* | 2/2008 | Neal | G06Q 30/02 |
| | | | 705/1.1 |
| 2008/0055189 A1* | 3/2008 | Wilk | G06F 3/1431 |
| | | | 345/1.3 |
| 2008/0235194 A1* | 9/2008 | Shima et al. | 707/3 |
| 2008/0288476 A1* | 11/2008 | Kim et al. | 707/4 |
| 2009/0119577 A1* | 5/2009 | Almbladh | 715/234 |
| 2009/0144328 A1* | 6/2009 | Martinez et al. | 707/104.1 |
| 2009/0158201 A1* | 6/2009 | Iampietro et al. | 715/781 |
| 2009/0254207 A1* | 10/2009 | Tiffany et al. | 700/97 |
| 2009/0327468 A1* | 12/2009 | Hirsch et al. | 709/223 |
| 2010/0070843 A1* | 3/2010 | Duym | 715/224 |
| 2010/0269039 A1* | 10/2010 | Pahlavan et al. | 715/702 |
| 2011/0083070 A1* | 4/2011 | Maryka et al. | 715/234 |
| 2011/0185016 A1* | 7/2011 | Kandasamy et al. | 709/203 |
| 2011/0252082 A1* | 10/2011 | Cobb et al. | 709/203 |
| 2011/0270933 A1* | 11/2011 | Jones et al. | 709/206 |
| 2011/0293334 A1* | 12/2011 | Liu | G03G 15/0173 |
| | | | 399/262 |
| 2011/0296296 A1* | 12/2011 | Eilers et al. | 715/234 |
| 2011/0302524 A1* | 12/2011 | Forstall | 715/781 |
| 2012/0054001 A1* | 3/2012 | Zivkovic et al. | 705/14.1 |
| 2012/0060109 A1* | 3/2012 | Han | G06F 3/1454 |
| | | | 715/769 |
| 2012/0154633 A1* | 6/2012 | Rodriguez | 348/231.99 |
| 2012/0166987 A1* | 6/2012 | Kang et al. | 715/765 |
| 2012/0208592 A1* | 8/2012 | Davis et al. | 455/556.1 |
| 2012/0210549 A1* | 8/2012 | Lee et al. | 29/25.02 |
| 2012/0242687 A1* | 9/2012 | Choi | 345/629 |
| 2012/0303429 A1* | 11/2012 | Nolledo et al. | 705/14.16 |
| 2013/0021535 A1* | 1/2013 | Kim | H04N 21/4122 |
| | | | 348/738 |
| 2013/0028132 A1* | 1/2013 | Choi | H04L 41/12 |
| | | | 370/254 |
| 2013/0038756 A1* | 2/2013 | Cheng | H04N 21/4788 |
| | | | 348/231.99 |
| 2013/0060590 A1* | 3/2013 | Goldberg et al. | 705/7.11 |
| 2013/0080937 A1* | 3/2013 | Sirpal | G06F 3/1438 |
| | | | 715/761 |
| 2013/0091326 A1* | 4/2013 | Choi | G06F 12/0866 |
| | | | 711/113 |
| 2013/0097714 A1* | 4/2013 | Yu | G06F 1/1454 |
| | | | 726/26 |
| 2013/0124675 A1* | 5/2013 | Mo | G06F 9/461 |
| | | | 709/217 |
| 2013/0132826 A1* | 5/2013 | Kim | G06F 17/30917 |
| | | | 715/239 |
| 2013/0179572 A1* | 7/2013 | Jin | H04L 41/50 |
| | | | 709/225 |
| 2013/0204935 A1* | 8/2013 | Lunde | 709/204 |
| 2013/0339536 A1 | 12/2013 | Burckart et al. | |
| 2014/0006402 A1* | 1/2014 | Lee | H04L 67/1063 |
| | | | 707/737 |
| 2014/0168277 A1* | 6/2014 | Ashley et al. | 345/672 |
| 2014/0359143 A1 | 12/2014 | Luukkala et al. | |

OTHER PUBLICATIONS

Freeman, "The Definitive Guide to HTML5", 2011.*
Jle et al., "The Impact of Ajax on network performance", 2007.*
Johanson et al., "Mutlibrowsing: Moving Web Content across Multiple Displays", 2001.*
Rekimoto, "Pick-and-Drop: A Direct Manipulation Technique for Multiple Computer Environments", 1997.*
Yang et al., "W3C Web and TV: Issue on Web technologies for N-Screen", 2006.*
Song et al., "Design and Implementation of Metadata for N-Screen UCC Recommender System", 2011.*
Kim et al., "Data Exchange Method for Web-based Collaboration System between Smart Devices", 2012.*
Kim et al., "Dynamic Addition and Deletion of Device in N-Screen Environment", 2012.*
Jeong et al., "Ontology-based Automatic Video Annotation Technique in Smart TV Environment", 2011.*
Choi et al., "A Design of Service Migration Mechanism in HTML5-based Convergence Service," Journal of Korea Multimedia Society vol. 15, No. 4, Apr. 2012 (pp. 540-551).
Office Action issued in Korean Pat. Appl. No. 10-2012-0080074 dated Dec. 18, 2013.
Office Action issued in Korean Pat. Appl. No. 10-2012-0080075 dated Oct. 18, 2013.
Non-Final Office Action issued in U.S. Appl. No. 13/624,503, mailed Apr. 14, 2015.

* cited by examiner

FIG. 2

| Web action management | |
|---|---|
| Share<br>  Image<br>  Link<br>Share<br>  Bookmark | ⊞ Delicious<br>Keep, share, and discover the best of the Web using Delicious  ▽<br>[Remove] [Disable]<br><br>☐ Twitter<br>Twitter a URL and share it with all your friends.  ⇕<br>[Remove] [Disable]<br><br>◎ Blinklist<br>We give you a button to "blink!" web pages  △<br>[Remove] [Disable]<br><br>▦ Digg<br>Digg is a place for people to discover and share on the web<br>[Remove] [Disable] |

FIG. 18

```
1810  var intent = new Intent(
1820    "http://webintents.org/edit",
1830    "webObject/html5",
1840    "http://kaisquare.kaist.ac.kr/pages/commentBox.php?cid=c1234&textBoxType=multipleLine");
1850  window.navigator.startActivity(intent, function(intentData) {});
```

```
<intent
    action= "http://webintents.org/edit"
    type= "text/*"
    href= "commeBox.php"
    title= "Comment"
    disposition= "window"
/>
```

```
<?xml version="1.0" ?>
<root xmlns="urn:schemas-kaist-org:device-1-0" >
  <specVersion>
    <major>1</major>
    <minor>0</minor>
  </specVersion>
  <device>
    <universialDeviceDescription>
      http://mmlab.kaist.ac.kr/userID/dke00988-slk48wej-3jfna-87329
    </universialDeviceDescription>
    <Intents>
      <intent
        action=http://webintent.org/edit
        type= "text/*"
        href= "commeBox.php"
        title= "Comment"
        disposition= "window"
      />
    </Intents>
  </device>
```

2010 — (universialDeviceDescription section)
2020 — (Intents section)

FIG. 22

```
<?xml version="1.0" ?>
<root xmlns="urn:schemas-kaist-org:device-1-0" >
  <specVersion>
    <major>1</major>
    <minor>0</minor>
  </specVersion>
  <device>
    <universialDeviceDescription>
      http://mnlab.kaist.ac.kr/userID/dkc00988-slk48wcj-3jfna-87329
    </universialDeviceDescription>
    <Name>
      Mobile Phone
    </Name>
    <deviceType>
      urn:schemas-kaist-org:device:WebIntents:1
    </deviceType>
    <Intents>
      <intent
        action=http://webintent.org/edit
        type="text/*"
        href="commeBox.php"
        title="Comment"
        isposition="window"
      />
    </Intents>
  </device>
```

2200

2210, 2220, 2230, 2240

METHOD AND APPARATUS FOR MOVING WEB OBJECT BASED ON INTENT

CROSS-REFERENCE TO RELATED APPLICATIONS

This application claims the priority benefit of Korean Patent Application Nos. 10-2012-0080074, filed on Jul. 23, 2012, 10-2012-0080077, filed on Jul. 23, 2012, and 10-2012-0080075, filed on Jul. 23, 2012, the contents all of which are hereby incorporated by reference for all purposes as if fully set forth herein. This application is related to co-pending U.S. application Ser. No. 13/624,503, filed Sep. 21, 2012 and entitled METHOD AND APPARATUS FOR PROCESSING MOVEMENT OF WEB OBJECT BASED ON INTENT, which is commonly assigned and the contents of which are hereby incorporated by reference for all purposes as if fully set forth herein.

BACKGROUND OF THE INVENTION

1. Field of the Invention

Exemplary embodiments relate to a method, apparatus and system for providing a web service including a movable web object, and more particularly, to a method and apparatus for moving a web object based on intent.

2. Description of Related Art

A web object refers to an object accessible through the web. A web service may provide one or more object. A web service user may be provided with the web service by accessing the web object provided through a web browser installed in a device of the user.

With the spread of various devices capable of web browsing, for example, personal computers (PCs), smart phones, tablet PCs, smart televisions (TVs), and the like, the user may be provided with the web service through a plurality of devices. The user may be provided with the web service through a plurality of screens of the plurality of devices using an N-screen service. The user may be provided with a plurality of screens associated with the web service through the plurality of devices by using an N-screen service. In this instance, the plurality of screens may display content related to each screen.

When the user is provided with the web service through a plurality of devices, a web browser screen of one device may be designated as a primary screen and a web browser screen of the other device may be designated as a second screen. Also, among the plurality of devices, a device outputting the primary screen may be designated as a main device, and a device outputting the second screen may be designated as an auxiliary device.

To provide the web service, a need to interwork the primary screen with the second screen is present. That is, information displayed on the primary screen may be related to information displayed on the second screen. Here, information may include content represented through the web object, for example, an image, a video, an audio, and music, as well as the web object. For example, the primary screen outputted from the main device may display content, and the second screen outputted from the auxiliary device may display metadata of the content, for example, a title, a genre, a cast, and the like.

A web service provider may implement the web service for providing the user with related information through a plurality of devices. For example, when the main device outputting the primary screen receives a service by accessing a web server, the auxiliary device outputting the second screen may receive, from the web server, information related with the service provided to the main device by accessing the web server.

SUMMARY OF THE INVENTION

An aspect of the present invention provides a method of moving a web object from a primary device, the method including loading a web page, identifying a web object supporting movability on the loaded web page, determining whether the identified web object can be moved to a secondary device based on movability information of the identified web object, and transmitting a request for movement of the identified web object to the secondary device when the identified web object can be moved to the secondary device.

The method may further include registering the movability information of the identified web object and information about the primary device.

The method may further include receiving information about a list of registered devices, displaying the list of registered devices based on the received information about the list of registered devices, and recognizing that the secondary device is selected from the displayed list of registered devices.

The registered devices may correspond to devices in which reception of an intent for a web service running on the primary device is registered.

Each of the registered devices provided in the list of registered devices may be displayed distinguishably based on whether the web object can be moved to the registered device.

The identified web object may be plural.

The method may further include recognizing a selected web object among a plurality of identified web objects.

The transmitting may include transmitting a request for movement of the selected web object among the plurality of identified web objects to the secondary device.

The method may further include displaying each of the plurality of identified web objects distinguishably based on whether the identified web object can be moved to the secondary device.

The method may further include updating the web page after the identified web object is moved.

The web object supporting movability may be identified based on a movability tag representing an attribute of the web object on the web page.

The request for movement of the identified web object to the secondary device may include invoking an intent to the secondary device.

The primary device and the secondary device may correspond to N-screen devices of a web service providing the web page.

The method may further include rendering the web page in a web browser, and re-rendering the web page in the web browser, aside from the web object supporting movability, while maintaining a full layout of the web page.

The re-rendering may include maintaining the full layout of the web page by substituting an image for an area of the web object supporting movability.

The re-rendering may include setting the web object invisible in the web browser, and displaying an image on an area corresponding to the web object.

Another aspect of the present invention also provides a device including a processing unit to load a web page, to identify a web object supporting movability on the loaded web page, to determine whether the identified web object can be moved to a secondary device based on movability information of the identified web object, and to generate a request for movement of the identified web object to the secondary device when the identified web object can be moved to the secondary device, and a transmitting/receiving unit to receive the web page and to transmit the request for movement of the identified web object to the secondary device.

Still another aspect of the present invention also provides a method of moving a web object using a push server from a primary device, the method including loading a web page, identifying a web object supporting movability on the loaded web page, determining whether the identified web object can be moved to a secondary device based on movability information of the identified web object, pushing, to the push server, movement of the web object to the secondary device when the identified web object can be moved to the secondary device, and receiving a response to the push from the push server.

The method may further include receiving a request for the web page from the secondary device, and transmitting the web page to the secondary device.

The pushing may include invoking, by the push server, a uniform resource locator (URL) or an application of the secondary device and receiving a response to the invocation.

The invoking may correspond to invoking an intent provided by the secondary device.

The primary device and the secondary device may correspond to N-screen devices of a web service providing the web page.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 is a diagram illustrating an example of a web intent;

FIG. 18 is a diagram illustrating a code used for invoking an intent illustrating according to an embodiment of the present invention;

FIG. 19 is a diagram illustrating a code used for registering an intent according to an embodiment of the present invention;

FIG. 20 is a diagram illustrating a page displaying information about a primary device according to an embodiment of the present invention;

FIG. 22 is a diagram illustrating a page displaying a capacity of a secondary device according to an embodiment of the present invention;

DETAILED DESCRIPTION OF THE INVENTION

Figure 1:
FIG. 1 is a diagram illustrating an example of an intent.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, the terms "uniform resource locator (URL)" and "uniform resource identifier (URI)" as used herein may have the same meaning, and may be used interchangeably.

The term "request" as used herein may correspond to a message indicating a request. The term "response" as used herein may correspond to a message indicating a response to the request. The term "web page" as used herein may correspond to data of a web page.

The term "script" as used herein may correspond to an arbitrary script on a web page, for example, JAVA script and the like.

The term "web object" as used herein may correspond to an object representing content of a web service.

A second screen may be available through movement of a web object. The movement of the web object may correspond to movement of the web object accessed through a primary screen of a primary device to a second screen of an auxiliary device to allow an access through the second screen of the auxiliary device.

For availability of a second screen, consideration needs to be given to the following.

First, among web services provided to a user, a web service accessible or controllable through a second screen needs to be identified by the user. When a web service accessible or controllable through the second screen is present, the presence of the connected second screen needs to be identified. That is, an auxiliary device providing the second screen connected to a web server providing the web service may be identified by the user, or a list of such auxiliary devices may be provided to the user.

Also, among web objects of the web service accessible or controllable on the second screen, a web object executable on the second screen needs to be identified by the user. Here, the executable web object may be determined based on types, features, and specifications of the second screen or the auxiliary device connected to the web server.

Furthermore, a method of moving a web object running on a primary screen to a second screen desired by the user needs to be provided. A method of receiving, by the auxiliary device providing the second screen, a request for movement of the web object may be provided. A method of displaying the request for movement of the web object to the user may be provided.

Hereinafter, exemplary embodiments associated with support of movability of the web object are described.

FIG. 1 is a diagram illustrating an example of an intent.

To invoke an application or a component of the application within another application or a component of another application, information about the corresponding application or component may be registered in an operating system (OS), a system, or a platform.

An intent may refer to a service or function for registering an application or a component to be invoked in an OS, a system, or a platform and making the registered application or component available through invocation under a predetermined situation. Also, the intent may refer to an object used for such a service.

In FIG. 1, a list of applications or components registered in a mobile terminal platform for the purpose of use as an intent is provided. The registered application or component may be titled, for example, "Google Buzz", "Google+", "Mail", and the like.

The intent may be used for invocation between the applications or components or for return of a result value of the invocation.

The intent may include information for invoking the application or component. The information may include a title and a property of the application or component to be invoked. Also, the intent may include information for transmitting the result value from the application or component to be invoked to the application or component performed invocation.

FIG. 2 is a diagram illustrating an example of a web intent.

The web intent may be an extension of an intent to a web environment or web service environment. The web intent may correspond to a framework for interworking between web-based applications and discovery of an available web service.

The web intent may provide connectivity to a registered web service in a web browsing environment. That is, the web intent may provide connectivity between an event of a web page and a registered web service. When a predetermined event occurs, the web intent may enable a web service connected to the predetermined event to respond to the predetermined event.

In FIG. 2, a list of registered web services available by the web intent is provided. The web service may be titled, for example, "Delicious", "Twitter", "Blinklist", and "Digg". The title may be followed by a description of the web service.

A web action may refer to an action taken by visitors from a visited web site or application to another web site or application. For example, the web action may correspond to an action taken to enable sharing of an article of a blog on a Twitter service by clicking a "Twitter" button at the bottom of the article. Here, a web site providing the blog may correspond to the visited web site. Also, a web site providing the Twitter service may correspond to another web site.

The web action taken on the web service may be removed, disabled, or enabled using a "remove" button, a "disable" button, or an "enable" button below the description of the web service.

The web intent may enable a rich integration between web applications. Available services on the web may transmit and receive rich data to execute jobs.

A web page providing the web intent may be referred to as a service page. A page for invoking and using the web intent may be referred to as a client page.

Hereinafter, the web intent may be abbreviated an "intent". The terms "web intent" and "intent" may be used interchangeably.

Figure 3:
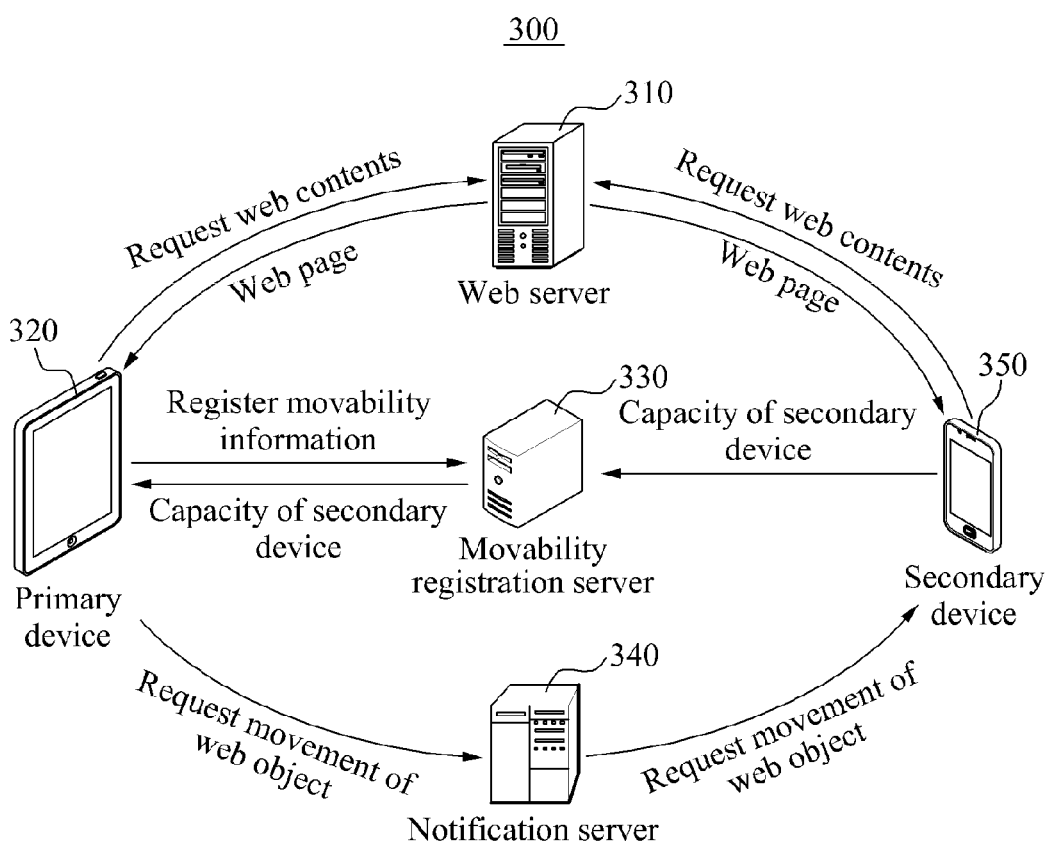
FIG. 3 is a diagram illustrating a system that supports movability of a web object and uses the moved web object according to an embodiment of the present invention.

FIG. 3 is a diagram illustrating a system 300 that supports movability of a web object and uses the moved web object according to an embodiment of the present invention.

The system 300 supporting movability of the web object may include a web server 310, a primary device 320, a movability registration server 330, a notification server 340, and a secondary device 350.

The web server 310 may receive a request for web content from each of the primary device 320 and the secondary device 350. Here, the web content may correspond to a web page of a web service. Also, the web page may include the web content. The web server 310 may provide the web page to each of the primary device 320 and the secondary device 350.

The primary device 320 may provide a primary screen. The primary device 320 may correspond to a device in which a web service provided by the web server 310 may be executed initially. The primary device 320 may register a web intent, and may move the web object to the secondary device 350 by invoking the web intent. Accordingly, the primary device 320 may be referred to as a web intent device.

The primary device 320 may register movability information of the web object on the web page in the movability registration server 330. After a web browser of the primary device 320 loads the web page, the primary device 320 may determine whether the web page supports movability of the web object or the intent. When movability of the web object or the intent is supported, the web browser may register movability information of the web object or information about the intent in the movability registration server 330.

The movability registration server 330 may correspond to an application server. The movability registration server 330 may register movability information of the web object or information about the intent in real time whenever a user uses the web service, and may provide movability information of the web object or information about the intent to the primary device 320 and the secondary device 350. Also, the movability registration server 330 may provide a function for registering capacity of each of the primary device 320 and the secondary device 350 and inquiring about the registered capacity.

The secondary device 350 may provide a second screen. The primary device 320 and the secondary device 350 may correspond to N-screen devices of the web service provided by the web server 310.

The secondary device 350 may register capacity of the secondary device 350 in the movability registration server 330. The movability registration server 330 may provide capacity information of the secondary device 350 to the primary device 320. The primary device 320 may use the capacity information of the secondary device 350 to determine whether the web object can be moved to the secondary device 350.

The primary device 320 may request movement of the web object to the notification server 340. The notification server 340 may transmit the request to the secondary device 350.

The notification server 340 may invoke the web service to the secondary device 350 based on the information about the intent, or may provide a function for receiving the web page or the web object based on the information about the intent.

Different types of devices, the web server 310, the primary device 320, the movability registration server 330, the notification server 340, and the secondary device 350 may interwork with one another using digital living network alliance (DLNA) or an endpoint discovery protocol.

When the web service is provided on the primary screen of the primary device 320, the following procedure may be required to connect the secondary device 350 to the web service.

First, registration of the web service may be required. The web service may be registered in the movability registration server 330 or application server. For example, among web services provided on the primary screen of the primary device 320, information about a web service function supported by the second screen of the secondary device 350 may be registered. Here, the web service function may correspond to a web object on a web page providing the web service. Also, availability of the secondary device 350 may be registered. Here, availability of the secondary device 350 may refer to accessibility of the secondary device 350 to the web service.

Next, device discovery may be required. The primary device 320 may discover the secondary device 350 to which a movable web object can be moved. For device discovery, a predetermined application interworking type, an application server interworking type, and a network protocol interworking type may be used.

For example, the predetermined application interworking type may include universal plug-and-play (UPNP) and DLNA. In the predetermined application interworking type, a predetermined application may be installed in the secondary device 350. The primary device 320 may determine connectivity of the secondary device 350 by accessing a home network server or a designated application server. The secondary device 350 may provide connectivity for a defined function by accessing the home network server or the designated application server.

The application server interworking type may be used for a predetermined service provided by interworking with the application server.

The network protocol interworking type may include receiving a configuration document type definition (DTD) element from an entry point, and connecting to information indicated by the configuration DTD element. To receive the configuration DTD element, a networked provisioning option, a service discovery standard of Internet protocol television (IPTV), may be used. Also, the network protocol interworking type may use a domain name space (DNS) mechanism in a dynamic host configuration protocol (DHCP) option 15. Also, the network protocol interworking type may use a multicast address registered in an Internet assigned numbers authority (IANA).

Device selection may include selecting the second screen of the secondary device 350 to which the web object of the service will be connected to. The web object may be displayed on the primary screen of the primary device 320.

Figure 4:
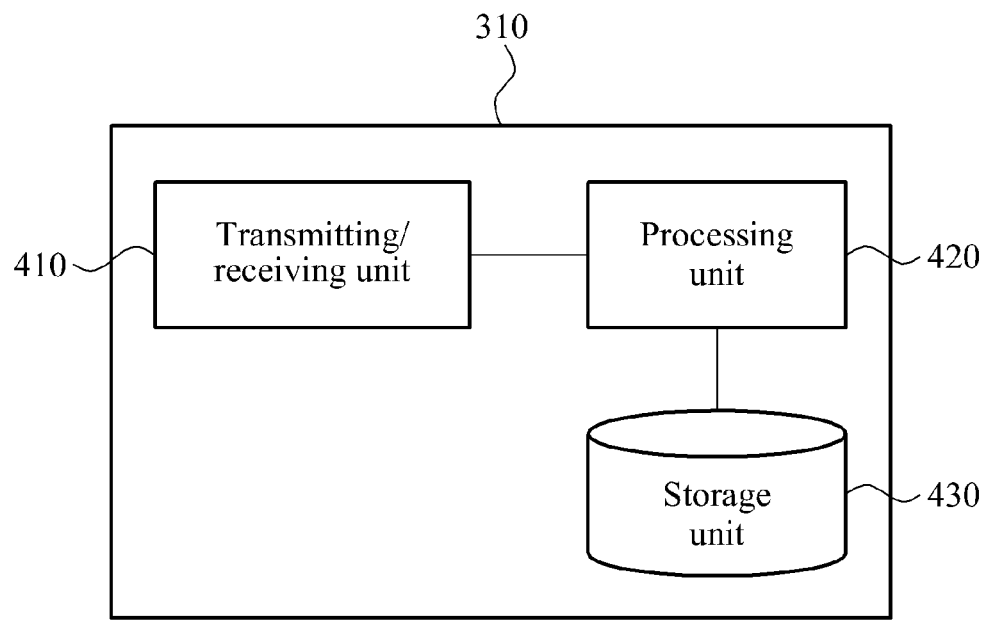
FIG. 4 is a block diagram illustrating a web server according to an embodiment of the present invention.

FIG. 4 is a block diagram illustrating a web server 310 according to an embodiment of the present invention.

The web server 310 may include a transmitting/receiving unit 410, a processing unit 420, and a storage unit 430.

The transmitting/receiving unit 410 may include a hardware module, for example, a network interface card, a network interface chip, a network interface port, and the like, and a software module, for example, a network device driver, a networking program, and the like. The transmitting/receiving unit 410 may receive information or data transmitted to the web server 310, and may transmit information or data to be transmitted by the web server 310. Also, the transmitting/receiving unit 410 may receive a signal or information inputted by a user.

The processing unit 420 may include at least one processor and at least one core in a processor. The processing unit 420 may perform an operation necessary to operate the web server 310. Here, the performing of the operation may include executing a program code stored in the storage unit 430.

The storage unit 430 may store data necessary to operate the web server 310. For example, the storage unit 430 may store a web page. The storage unit 430 may include a hardware module to store information, for example, a hard disk drive (HDD), a solid state drive (SSD), a random access memory (RAM), a flash memory, and the like, and a software module to store information, for example, a database (DB), a file system, a table, and the like.

Figure 5:
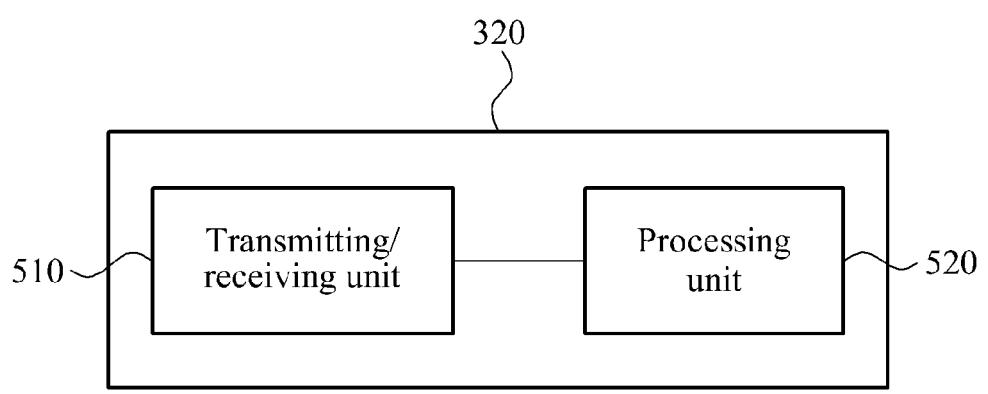
FIG. 5 is a block diagram illustrating a primary device according to an embodiment of the present invention.

FIG. 5 is a block diagram illustrating the primary device 320 according to an embodiment of the present invention.

The primary device 320 may include a transmitting/receiving unit 510 and a processing unit 520.

The transmitting/receiving unit 510 may include a hardware module, for example, a network interface card, a network interface chip, a network interface port, and the like, and a software module, for example, a network device driver, a networking program, and the like. The transmitting/receiving unit 510 may receive information or data transmitted to the primary device 320, and may transmit information or data to be transmitted by the primary device 320. Also, the transmitting/receiving unit 510 may receive a signal or information inputted by a user.

The processing unit 520 may include at least one processor and at least one core in a processor. The processing unit 520 may perform an operation necessary to operate the primary device 320.

Figure 6:
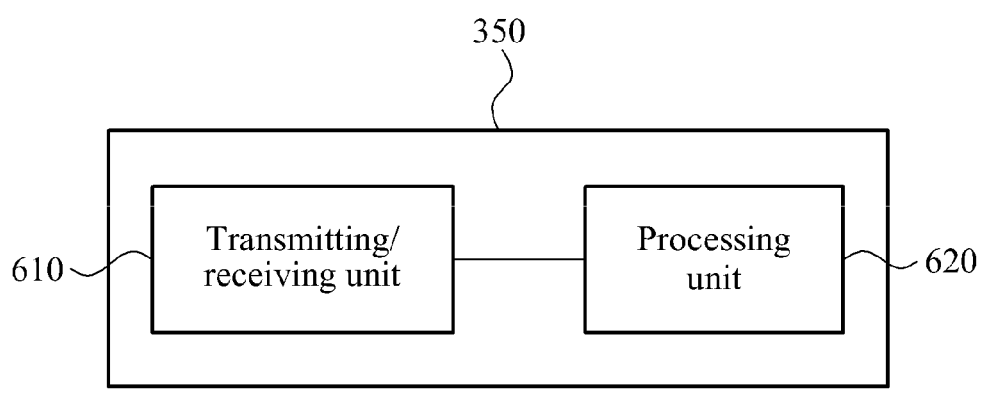
FIG. 6 is a block diagram illustrating a secondary device according to an embodiment of the present invention.

FIG. 6 is a block diagram illustrating the secondary device 350 according to an embodiment of the present invention.

The secondary device 350 may include a transmitting/receiving unit 610 and a processing unit 620.

The transmitting/receiving unit 610 may include a hardware module, for example, a network interface card, a network interface chip, a network interface port, and the like, and a software module, for example, a network device driver, a networking program, and the like. The transmitting/ receiving unit 610 may receive information or data transmitted to the secondary device 320, and may transmit information or data to be transmitted by the secondary device 320. Also, the transmitting/receiving unit 610 may receive a signal or information inputted by a user.

The processing unit 620 may include at least one processor and at least one core in a processor. The processing unit 620 may perform an operation necessary to operate the secondary device 350.

Figure 7:
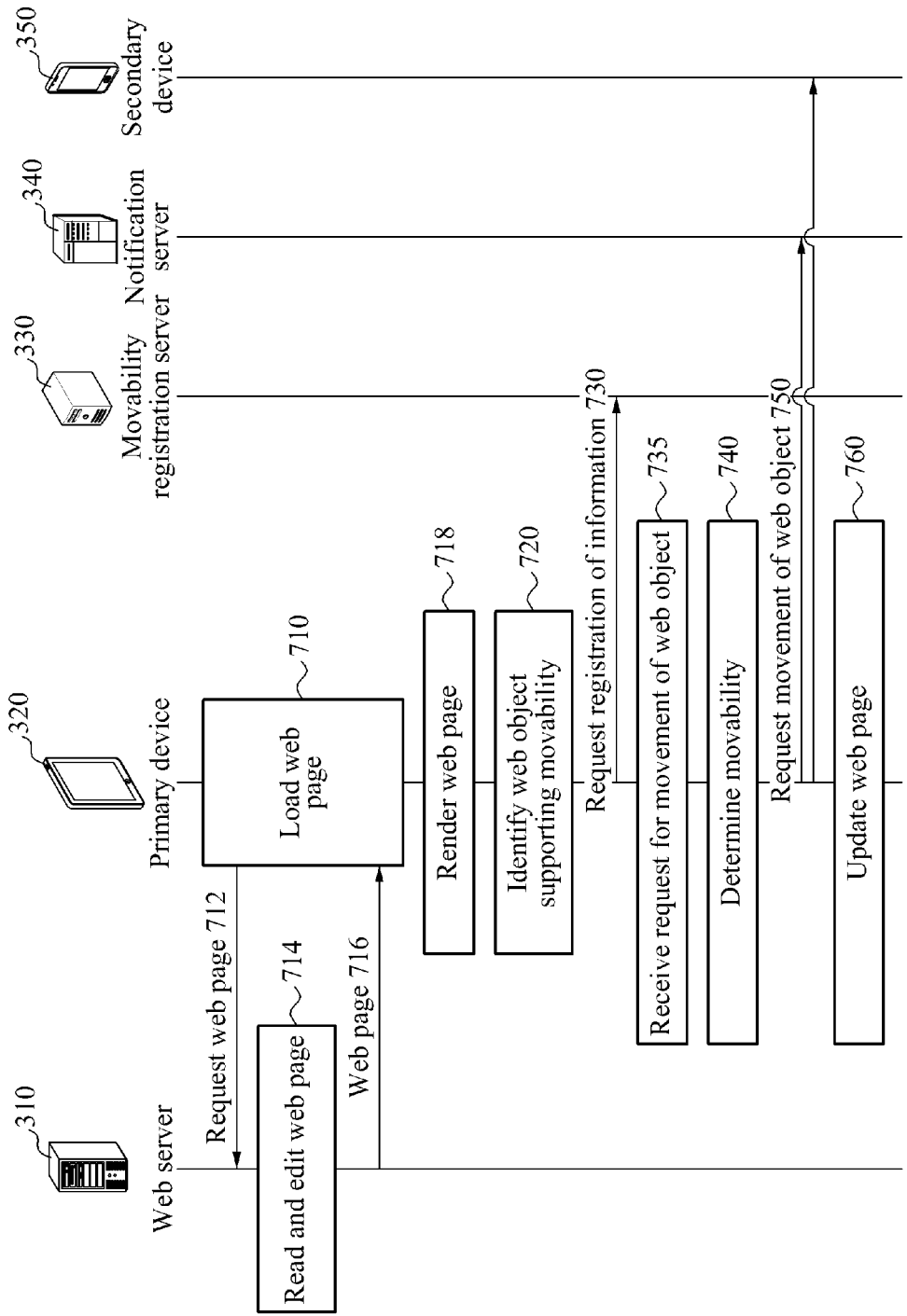
FIG. 7 is a signal flow diagram illustrating a method of moving a web object from a primary device according to an embodiment of the present invention.

FIG. 7 is a signal flow diagram illustrating a method of moving a web object from the primary device 320 according to an embodiment of the present invention.

In operation 710, the processing unit 520 of the primary device 320 may load a web page from the web server 310 through the transmitting/receiving unit 510. The operation 710 may include operations 712, 714, and 716. The web page may correspond to a service page of a web service provided by the web server 310.

In operation 712, the transmitting/receiving unit 510 of the primary device 320 may transmit a request for the web page to the transmitting/receiving unit 410 of the web server 310. The request for the web page may be generated by the processing unit 520 of the primary device 320.

In operation 714, the processing unit 420 of the web server 310 may read the requested web page from the storage unit 430, and may edit or process the web page read from the storage unit 430 suitably to provide to the primary device 320 in advance of transmitting to the transmitting/receiving unit 510 of the primary device 320. An example of editing and processing is described in further detail with reference to FIG. 17.

In operation 716, the transmitting/receiving unit 510 of the primary device 320 may receive the requested web page from the transmitting/receiving unit 410 of the web server 310.

In operation 718, the processing unit 520 of the primary device 320 may render the received web page in a web browser.

In operation 720, the processing unit 520 of the primary device 320 may identify a web object supporting movability among web objects on the loaded web page. The web object supporting movability may be plural.

The processing unit 520 may identify the web object supporting movability based on a movability tag describing an attribute of the web object on the web page. The movability tag may define additional information about the web object supporting movability in the web page or web content. That is, the movability tag may include additional information inserted in the web page or web content to indicate movability of the web object, as well as a hypertext markup language (HTML) code used to specify the web object.

The movability tag may correspond to an intent tag of the web object. The intent tag of the web object may indicate that the web object supports movability or that the web object is included in an area of content supporting movability.

The intent tag may be used on the web page in an overlappable manner. Accordingly, a plurality of intent tags may describe attributes of a plurality of web objects.

The processing unit 520 of the primary device 320 may identify a web object having the intent tag among web objects on the loaded web page to be the web object supporting movability.

In operation 730, the transmitting/receiving unit 510 of the primary device 320 may register movability information of the identified web object and information about the primary device 320 in the movability registration server 330. Here, the movability information of the web object may include intent support history information of the web object indicating a history of an intent supported by the web object. The information about the primary device 320 may include at least one of an identifier (ID) of the web service provided by the web server 310, an Internet protocol (IP) address of the primary device 320, and an address of the secondary device 350.

For registration, the transmitting/receiving unit 510 of the primary device 320 may transmit a request for registration of movability support information of the identified web object and information about the primary device 320 to the movability registration server 330.

The operations 720 and 730 may be performed based on a script on the web page. That is, the processing unit 520 of the primary device 320 may verify whether the movability tag is used on the web page by processing the script on the web page, and when the movability tag is present on the web page, may register the movability information of the web object indicated by the movability tag in the movability registration server 330. Also, the primary device 520 may wait for an event before the operation 735 is performed by the script. Here, the event may correspond to a request by a user for movement of the web object.

In operation 735, the transmitting/receiving unit 510 of the primary device 320 may receive the request by the user for movement of the web object. The processing unit 520 of the primary device 320 may recognize the request by the user for movement of the web object.

In operation 740, the processing unit 520 of the primary device 320 may determine whether the identified web object can be moved to the secondary device 350 based on the movability information of the identified web object. Here, the primary device 320 and the secondary device 350 may correspond to N-screen devices of the web service providing the web page.

In operation 750, when the identified web object can be moved to the secondary device 350, the transmitting/receiving unit 510 of the primary device 320 may transmit the request for movement of the identified web object to the secondary device 350. The transmitting/receiving unit 510 of the primary device 320 may transmit, to the notification server 340 or the secondary device 350, the request for movement of the identified web object to the secondary device 350. The request for movement of the identified web object to the secondary device 350 may be generated by the processing unit 520.

The processing unit 520 may move the identified web object supporting movability on the web page to the secondary device 350 through the transmitting/receiving unit 510.

The request for movement of the identified web object to the secondary device 350 may be executed by invoking the intent provided by the secondary device 350.

In operation 760, the processing unit 520 of the primary device 320 may update the web page after the identified web object is moved. The processing unit 520 may re-render the web page in the web browser. Here, the re-rendering may include re-rendering the web page in the web browser, aside from the web object supporting movability, while maintaining a full layout of the web page. That is, the processing unit 520 may re-render the web page in the web browser, aside from the web object supporting movability, while maintaining the full layout of the web page.

Figure 8:
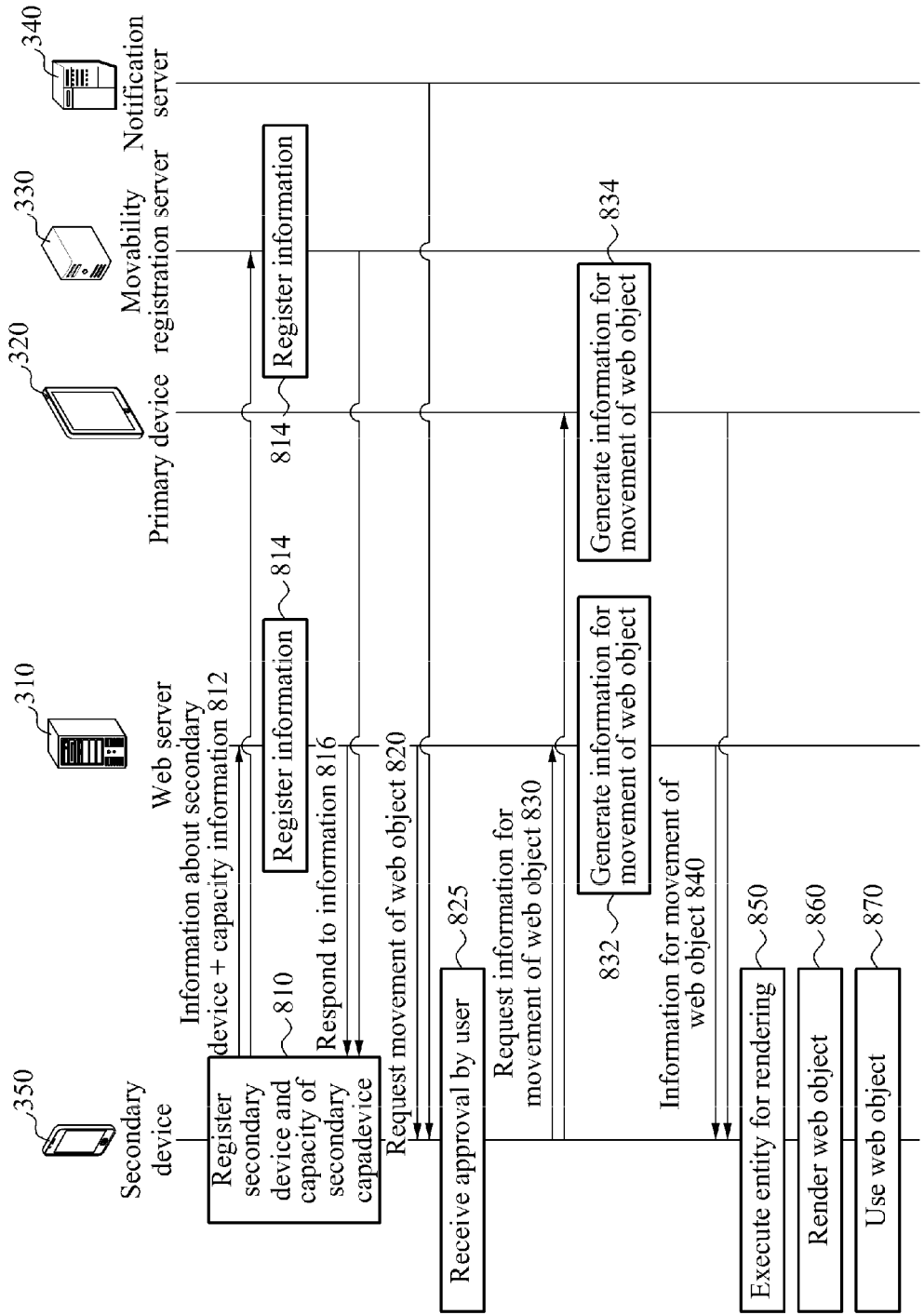
FIG. 8 is a signal flow diagram illustrating a method of processing, by a secondary device, a web object to be moved to the secondary device according to an embodiment of the present invention.

FIG. 8 is a signal flow diagram illustrating a method of processing, by the secondary device 350, the web object to be moved to the secondary device 350 according to an embodiment of the present invention.

In operation 810, the processing unit 620 of the secondary device 350 may register the secondary device 350 and capacity of the secondary device 350 through the transmitting/receiving unit 610. The operation 810 may include operations 812, 814, and 816. The secondary device 350 and the capacity of the secondary device 350 may be registered in the movability registration server 330 or the primary device 320.

The capacity of the secondary device 350 may include at least one of whether the secondary device 350 provides an ability to provide a global positioning system (GPS)-based location, a unique address of a network card assigned to the secondary device 350, a resolution of the secondary device 350, a web browser version of the secondary device 350, a an application supporting the intent of the secondary device 350, and a list of applications supporting the intent of the secondary device 350.

In operation 812, the transmitting/receiving unit 610 of the secondary device 350 may transmit the information about the secondary device 350 and the capacity information of the secondary device 350 to the movability registration server 330 or the transmitting/receiving unit 510 of the primary device 320.

In operation 814, the movability registration server 330 or the processing unit 520 of the primary device 320 may register the secondary device 350 and capacity of the secondary device 350 based on the received information about the secondary device 350 and the received capacity information of the secondary device 350. When the secondary device 350 and capacity of the secondary device 350 is registered in the movability registration server 330, the movability registration server 330 may provide the information about the secondary device 350 and the capacity information of the secondary device 350 to the primary device 320 in response to a request by the primary device 320.

In operation 816, the transmitting/receiving unit 610 of the secondary device 350 may receive a response to the information about the secondary device 350 and the capacity information of the secondary device 350 from the movability registration server 330 or the primary device 320.

The secondary device 350 and capacity of the secondary device 350 registered in operation 810 may be used in operations 1210 through 1230 of FIG. 12 described below.

The secondary device 350 may be plural. When a plurality of the secondary devices 350 is present, operation 810 may be performed on each of the plurality of secondary devices 350. The movability registration server 330 or the processing unit 520 of the primary device 320 may generate a list of the plurality of registered secondary devices 350 and capacity information of each of the plurality of registered secondary devices 350. Also, the movability registration server 330 may provide the list of the plurality of registered secondary devices 350 and the capacity information of each of the plurality of registered secondary devices 350 to the primary device 320 in response to a request by the primary device 320.

When operation 810 is completed, the secondary device 350 may wait for a request for movement of the web object.

In operation 820, the transmitting/receiving unit 610 of the secondary device 350 may receive the request for movement of the web object. The request for movement of the web object may be outputted from the transmitting/receiving unit 510 of the primary device 320. The request for movement of the web object may be transmitted from the transmitting/receiving unit 510 of the primary device 320 to the transmitting/receiving unit 610 of the secondary device 350, directly or via the notification server 340. The request for movement of the web object may be transmitted to the transmitting/receiving unit 610 in the form of a notification message.

The request for movement of the web object may correspond to invocation of the intent provided by the secondary device 350. The request for movement of the web object may correspond to notification of the intent. The secondary device 350 may receive notification of the intent, and may execute a service or application corresponding to the received intent. Here, the executing of the service may include loading the web page in the web browser and displaying the loaded web page.

In operation 825, the transmitting/receiving unit 610 of the secondary device 350 may receive an approval by the user for the request for movement of the web object. The processing unit 620 of the secondary device 350 may recognize the approval by the user for the request for movement of the web object.

In operation 830, the processing unit 620 of the secondary device 350 may request information for movement of the web object through the transmitting/receiving unit 610.

Here, it is determined that the web object can be moved to the secondary device 350 by the processing unit 520 of the primary device 320 based on the capacity information of the secondary device 350.

The transmitting/receiving unit 610 may transmit the request for information for movement of the web object. Here, the request for information for movement of the web object may be transmitted to the transmitting/receiving unit 410 of the web server 310 or the transmitting/receiving unit 510 of the primary device 320.

In operation 832, when the request for information for movement of the web object is transmitted to the transmitting/receiving unit 410 of the web server 310, the processing unit 420 of the web server 310 may generate information for movement of the web object. Here, the information for movement of the web object may include information about the web object. Also, the information for movement of the web object may include a web page including the web object.

In operation 834, when the request for information for movement of the web object is transmitted to the transmitting/receiving unit 510 of the primary device 320, the processing unit 520 of the primary device 320 may generate information for movement of the web object. Here, the information for movement of the web object may include movability information of the web object supporting movability identified in operation 720 of FIG. 7. Also, the information for movement of the web object may include the entire or a portion of the web page loaded in operation 710 of FIG. 7.

In operation 840, the transmitting/receiving unit 610 of the secondary device 350 may receive the information for movement of the web object from the transmitting/receiving unit 410 of the web server 310 or the transmitting/receiving unit 510 of the primary device 320.

In operation 850, the processing unit 620 of the secondary device 350 may execute an entity for rendering the moved web object. Here, the entity may include at least one of a running web browser, a new window of a running web browser, a new web browser, and an application.

For example, the processing unit 620 of the secondary device 350 may operate a web browser. Also, the processing unit 620 may generate a new window of the web browser operating in the secondary device 350. Also, the processing unit 620 may execute an application. Here, the executed application may correspond to an application processing the request for movement of the web object in operation 820.

In operation 860, the processing unit 620 of the secondary device 350 may render the web object based on the received information for movement of the web object. The processing unit 620 may process movement of the web object by rendering the web object.

For example, when a web browser is operated in operation 850, the processing unit 620 may render the moved web object in the web browser. When a new window of a running web browser is generated in operation 850, the processing unit 620 may render the moved web object in the new window of the running web browser. When an application is executed in operation 850, the processing unit 620 may render the moved web object in the application.

In operation 870, the processing unit 620 of the secondary device 350 may use the web object by manipulation by the user. For example, the processing unit 620 may transmit data associated with the web object to the transmitting/receiving unit 410 of the web server 310 or the transmitting/receiving unit 510 of the primary device 320 through the transmitting/receiving unit 610 using a function provided by the web object.

Figure 9:
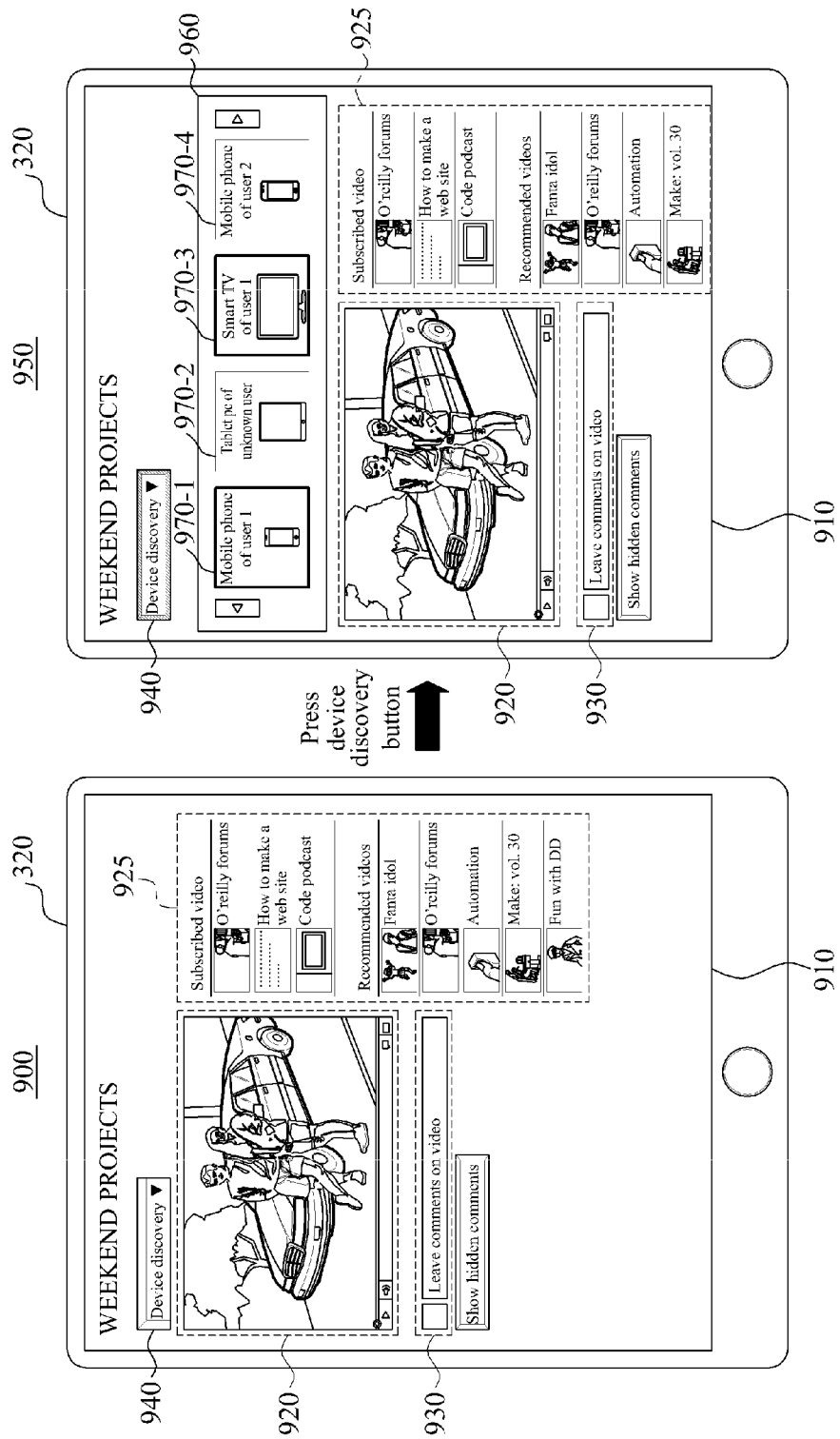
FIG. 9 is a diagram illustrating an example of a screen displaying a plurality of connectable secondary devices.

FIG. 9 is a diagram illustrating an example of a screen displaying a plurality of connectable secondary devices.

A first state 900 may display the primary device 320 in which a web page on a primary screen 910 is rendered. The first state 900 may correspond to a received web page rendered in the web browser in operation 718 of FIG. 7.

A second state 950 may display the primary device 320 in which a plurality of connectable secondary devices is displayed in the web browser of the primary screen 910.

In FIG. 9, the web page may include a first web object 920, a second web object 925, and a third web object 930. Here, the first web object 920, the second web object 925, and the third web object 930 may correspond to the web object supporting movability identified by the processing unit 520 in operation 720 of FIG. 7 among web objects on the loaded web page.

The web page may include a device discovery button 940. For example, when the device discovery button 940 is pressed by the user, the state of the primary device 320 may change from the first state 900 to the second state 950.

In the second state 950, a list of registered devices 960 in the web browser may be displayed. Each item of the list of registered devices 960 may represent one of the plurality of secondary devices. In FIG. 8, the list of registered devices 960 may include an item 970-1 representing a $1^{st}$ secondary device, an item 970-2 representing a $2^{nd}$ secondary device, an item 970-3 representing a $3^{rd}$ secondary device, and an item 970-4 representing a $4^{th}$ secondary device.

Each item may include at least one of an icon, an image, and a photo representing the secondary device 350 corresponding to the item, at least one of an icon, a symbol, a character, and a character string representing an owner or user of the secondary device 350 corresponding to the item, and at least one of an icon, a symbol, a character, and a character string representing a type of the secondary device 350 corresponding to the item. The icon, image, or photo representing the secondary device 350 may be selected based on a type of the secondary device 350. For example, in FIG. 9, the item 970-1 representing the $1^{st}$ secondary device may include a user of the $1^{st}$ secondary device, "user 1", a type of the $1^{st}$ secondary device, "mobile phone", and an image representing the $1^{st}$ secondary device.

Each registered device in the list of registered devices 960 may be displayed distinguishably based on whether the web object can be moved to the registered device. For example, an item corresponding to a registered device to which the web object can be moved may be bordered by a thick line, and an item corresponding to a registered device to which the web object cannot be moved may be bordered by a thin line. Also, among the list of registered devices 960, a registered device to which the web object can be moved may be displayed in a different color representing that the registered device is activated, from a color of a registered device to which the web object cannot be moved.

Figure 10:
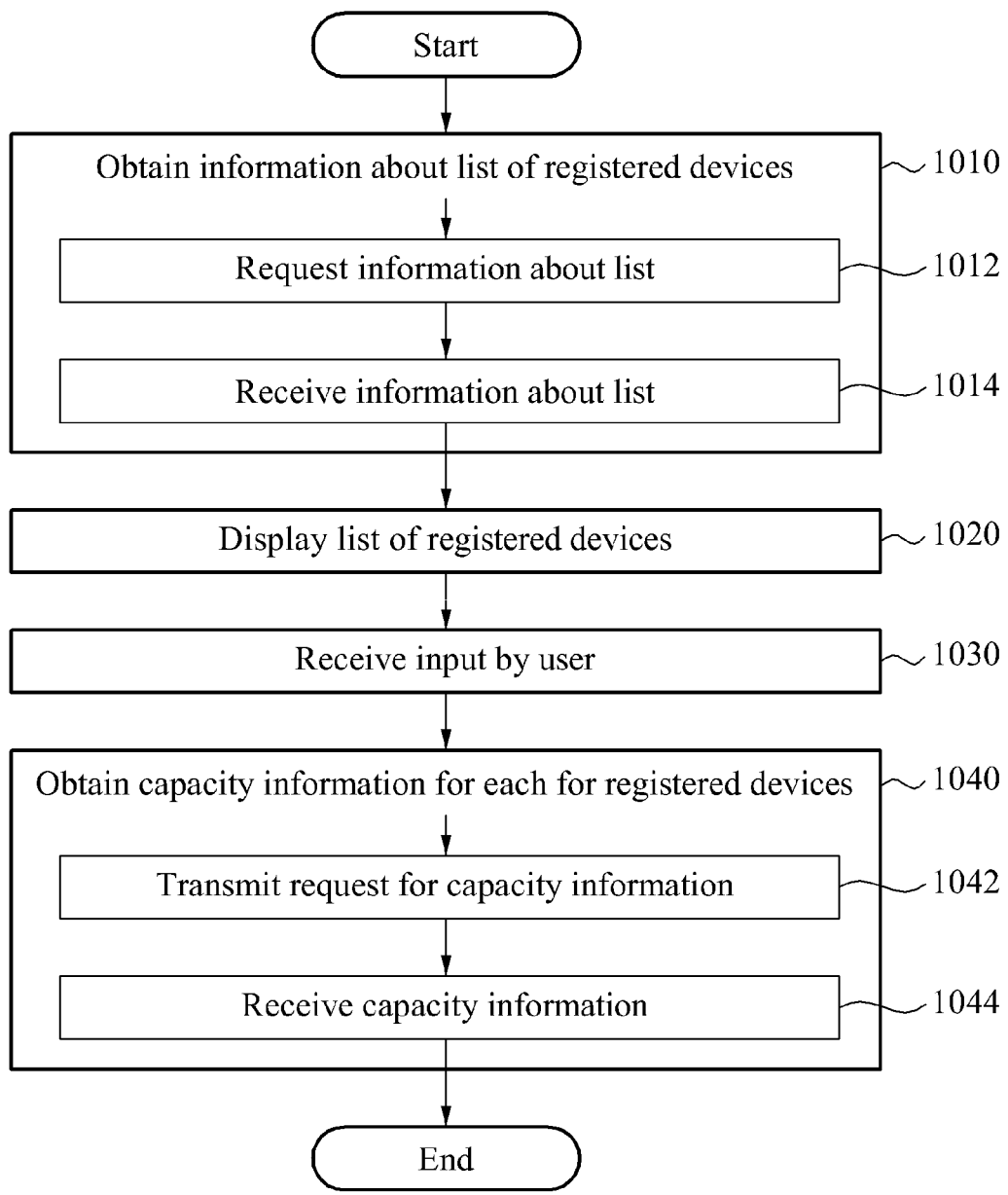
FIG. 10 is a flowchart illustrating a method of selecting a secondary device to transmit a web object among a plurality of connectable secondary devices according to an embodiment of the present invention.

FIG. 10 is a flowchart illustrating a method of selecting the secondary device 350 to transmit the web object among a plurality of connectable secondary devices according to an embodiment of the present invention.

The method of moving the web object from the primary device 320 according to FIG. 7 may include operations 1010 through 1044 described below. For example, the operations 1010 through 1044 may be performed after operation 735 of FIG. 7 or before operation 750 of FIG. 7.

The receiving of the request by the user in operation 735 may include pressing the device discovery button 925 described with reference to FIG. 9. The processing unit 520 of the primary device 320 may recognize the press of the device discovery button 925 to be the request by the user for movement of the web object.

In operation 1010, the processing unit 520 of the primary device 320 may obtain information about the list of registered devices through the transmitting/receiving unit 510. The operation 1010 may include operations 1012 and 1014.

The registered devices may correspond to the secondary device 350 able to receive the intent being performed in the primary device 320. For example, the registered devices may correspond to a device in which reception of the intent for the web service running in the primary device 320 is registered in the movability registration server 330.

In operation 1012, the transmitting/receiving unit 510 of the primary device 320 may transmit a request for information about the list of registered devices 960 to the movability registration server 330 or the transmitting/receiving unit 610 of the secondary device 350.

In operation 1014, the transmitting/receiving unit 510 of the primary device 320 may receive the information about the list of registered devices 960 from the movability registration server 330 or the transmitting/receiving unit 610 of the secondary device 350.

The information about the list of registered devices 960 may include capacity information for each of the registered devices. The capacity of each device may include at least one of an ability of the device to provide a GPS-based location, a unique address of a network card assigned to the device, a resolution of the device, a web browser version of the device, an application supporting the intent of the device, and a list of applications supporting the intent of the device.

In operation 1020, the processing unit 520 of the primary device 320 may display the list of registered devices 960 in the web browser based on the received information about the list of registered devices 960. The secondary device 350 may correspond to a device corresponding to an item of the list of registered devices 960. As described with reference to FIG. 9, the processing unit 520 may display information about each of the registered devices along with the list of registered devices 960.

The processing unit 520 may display each of the registered devices in the list of registered devices 960 distinguishably based on whether the web object can be moved to the registered device. For example, the processing unit 520 may display an item corresponding to a registered device, to which the web object can be moved, with a thick border line, and may display an item corresponding to a registered device, to which the web object cannot be moved, with a thin border line. Also, among the list of registered devices 960, the processing unit 520 may display a registered device to which the web object can be moved, in a different color representing that the registered device is activated, from a color of a registered device to which the web object cannot be moved.

In operation 1030, the transmitting/receiving unit 510 of the primary device 320 may receive an input by the user for selection of the secondary device 350 from the list of registered devices 960. The processing unit 520 of the primary device 320 may recognize that the secondary device 350 is selected from the displayed list of registered devices 960 by the user. Here, the selection by the user may include clicking or touching an item representing the secondary device 350 among the list of registered devices 960.

That is, the secondary device 350 may correspond to a device selected by the user to move the web object among the devices in the list of registered devices 960.

In operation 1040, the processing unit 520 of the primary device 320 may obtain capacity information for each of the registered devices or capacity information of the secondary device 350 through the transmitting/receiving unit 510. The operation 1040 may include operations 1042 and 1044.

In operation 1042, the transmitting/receiving unit 510 of the primary device 320 may transmit a request for the capacity information of each of the registered devices to the movability registration server 330 or each of the registered devices. Also, the transmitting/receiving unit 510 of the primary device 320 may transmit a request for the capacity information of the secondary device 350 to the transmitting/receiving unit 610 of the secondary device 350.

In operation 1044, the transmitting/receiving unit 510 of the primary device 320 may receive the capacity information of each of the registered devices from the movability registration server 330 or each of the registered devices. Also, the transmitting/receiving unit 510 of the primary device 320 may receive the capacity information of the secondary device 350 from the secondary device 350.

The received capacity information of each of the registered devices and the received capacity information of the secondary device 350 may be used to identify a web object that can be moved to each of the registered devices or the secondary device 350, among a plurality of identified web objects.

Figure 11:
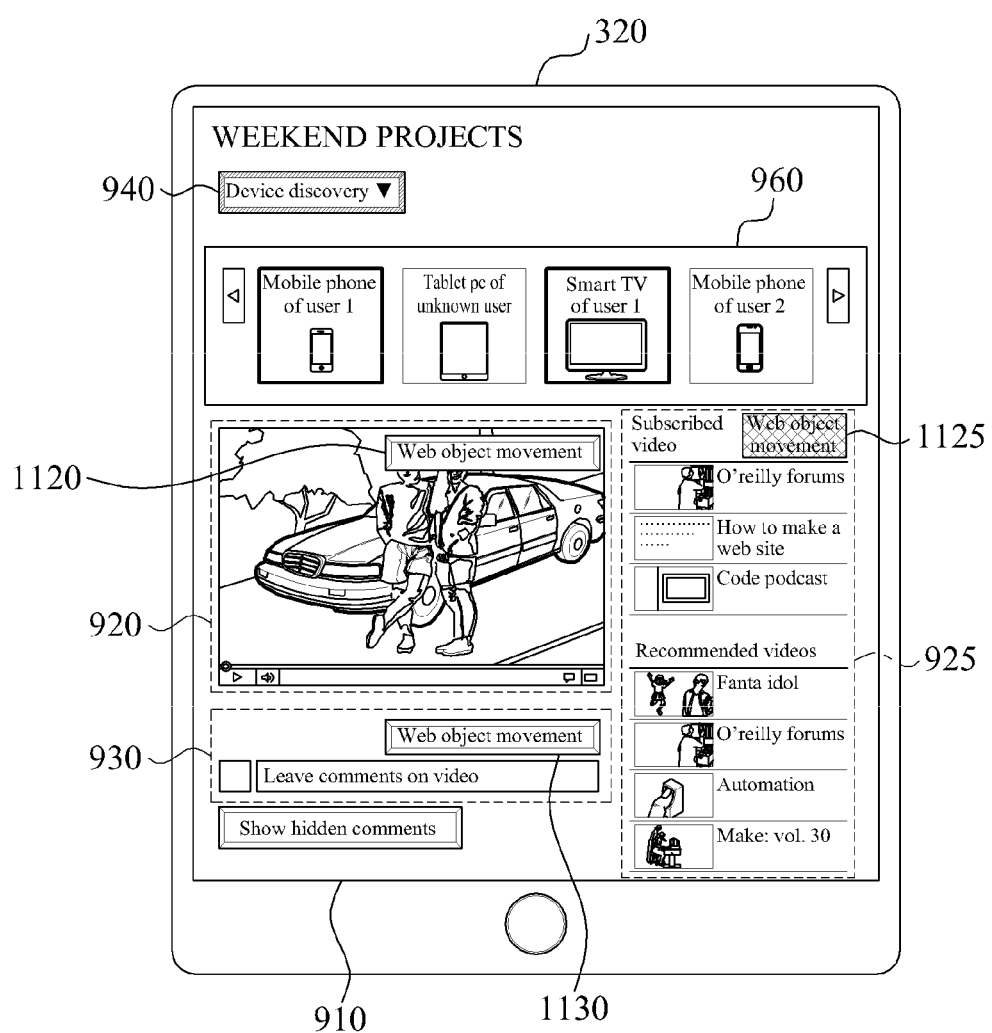
FIG. 11 is a diagram illustrating an example of a screen for selecting a web object to be moved among a plurality of web objects.

FIG. 11 is a diagram illustrating an example of a screen for selecting a web object to be moved among a plurality of web objects.

The web object supporting movability identified in operation 720 of FIG. 7 may be plural. In FIG. 11, the plurality of web objects may include the first web object 920, the second web object 925, and the third web object 930. Also, the 1$^{st}$ secondary device may correspond to the selected secondary device 350 to which the web object is to be moved.

When the secondary device 350 to which a web object is to be moved is selected from the list of registered devices 960, a web object able to move to the selected secondary device 350 among the plurality of web objects may be displayed distinguishably. Each of the plurality of web objects may be displayed distinguishably based on whether the web object can be moved to the secondary device 350. For example, a web object that can be moved to the secondary device 350 may be displayed in which a button is shown to be active, and a web object that can be moved to the secondary device 350 may be displayed in which a button is shown to be inactive. In FIG. 11, the first web object 920 and the third web object 930 that can be moved to the secondary device 350 may be displayed in which buttons 1120 and 1130 for web object movement are shown to be active, respectively. Conversely, the second web object 925 that cannot be moved to the secondary device 350 may be displayed in which a button 1125 for web object movement is shown to be inactive.

The user may select a web object to be moved to the secondary device 350 among the displayed web objects that can be moved to the secondary device 350. Here, the selection by the user may include clicking or touching a web object or a button of the web object among the displayed web objects that can be moved to the secondary device 350.

Figure 12:
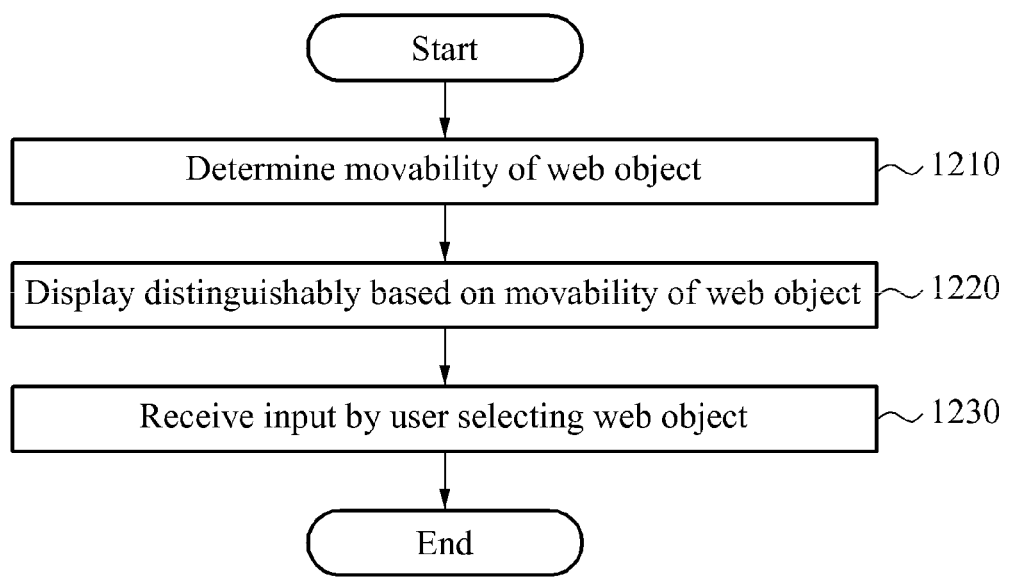
FIG. 12 is a flowchart illustrating a method of selecting a web object to be moved to a secondary device among a plurality of web objects according to an embodiment of the present invention.

FIG. 12 is a flowchart illustrating a method of selecting the web object to be moved to the secondary device 350 among the plurality of web objects according to an embodiment of the present invention.

The method of moving the web object from the primary device 320 according to FIG. 7 may include operations 1210 through 1230 described below. For example, operations 1210 through 1230 may be performed after operation 735 of FIG. 7, after operations 1010 through 1044 of FIG. 10, or before operation 750 of FIG. 7.

All the web objects on the web page may not be moved to the connectable secondary device 350. Hereinafter, a method of determining whether the web object can be moved to the secondary device 350 is described.

In operation 1210, the processing unit 520 of the primary device 320 may determine whether each of the plurality of identified web objects can be moved to the secondary device 350. Here, each of the plurality of identified web objects may correspond to the web object identified in operation 720 of FIG. 7. That is, the identified web object may be plural.

The processing unit 520 may determine whether each of the plurality of identified web objects can be moved to the secondary device 350 based on a capacity of the secondary device 350. The processing unit 520 may determine whether each of the plurality of identified web objects can be displayed or played on the second screen of the secondary device 350 based on capacity of the secondary device 350.

For example, when the secondary device 350 is unable to provide a GPS-based location, a web object requiring the GPS-based location cannot be moved to the secondary device 350. Also, a web object may require a minimum resolution for rendering, and when a resolution of the secondary device 350 is less than the minimum resolution, the web object cannot be moved to the secondary device 350.

The processing unit 520 may determine the capacity of the secondary device 350 by referring to a description of a web intent device described with reference to FIG. 23. The description of the web intent device may describe whether the second screen of the secondary device 350 is able to display or play the web object.

Also, the processing unit 520 may determine whether the secondary device 350 can display the web object using an action attribute value and a type attribute value of an intent tag of the web object. The intent tag and the attribute of the intent tag are described in further detail with reference to FIG. 19.

The web object displayable on the secondary device 350 may correspond to a web object that can be moved to the secondary device 350. That is, the processing unit 520 may determine whether each of the plurality of identified web objects can be moved to the secondary device 350 based on an action attribute value and a type attribute value of an intent tag of each of the plurality of identified web objects.

The script may be used to verify whether an action attribute and a type attribute are present in the intent tag of the web object.

Also, the processing unit 520 may determine whether the secondary device 350 can display the web object by comparing the action attribute value and the type attribute value of the intent tag of the web object to the capacity of the secondary device 350. The processing unit 520 may determine whether each of the plurality of identified web objects can be moved to the secondary device 350 by comparing the action attribute value and the type attribute value of the intent tag of each of the plurality of identified web objects to the capacity of the secondary device 350.

In operation 1220, the processing unit 520 of the primary device 320 may display each of the plurality of identified web objects distinguishably based on whether the web object can be moved to the secondary device 350. For example, the processing unit 520 may display a web object that can be moved to the secondary device 350 such that a button included in the web object is shown to be active, and a web object that cannot be moved to the secondary device 350 such that a button included in the web object is shown to be inactive. Also, the processing unit 520 may display each of the plurality of identified web objects distinguishably based on whether the web object can be moved to the secondary device 350, using different colors. Among the plurality of identified web objects, a first color used for a web object that can be moved to the secondary device 350 may be different from a second color used for a web object that cannot be moved to the secondary device 350. Also, the processing unit 520 may display each of the plurality of identified web objects distinguishably based on whether the web object can be moved to the secondary device 350, using borders of different thicknesses.

The operations 1210 and 1220 may be performed based on the script on the web page. That is, the processing unit 520 of the primary device 320 may determine whether each of the plurality of identified web objects can be moved to the secondary device 350 by processing the script on the web page. Also, the processing unit 520 of the primary device 320 may display each of the plurality of identified web objects distinguishably based on whether the web object can be moved to the secondary device 350, by processing the script on the web page.

In operation 1230, the transmitting/receiving unit 510 of the primary device 320 may receive an input by the user for selection of one of the plurality of identified web objects. The processing unit 520 of the primary device 320 may recognize that the web object is selected from the plurality of identified web objects. Here, the selection by the user may include clicking or touching one of the plurality of identified web objects.

The selected web object may correspond to the web object to be moved to the secondary device 350 in operation 750 of FIG. 7. That is, in operation 750, the transmitting/receiving unit 510 of the primary device 320 may transmit a request for movement of the selected web object to the secondary device 350 among the plurality of identified web objects.

Figure 13:
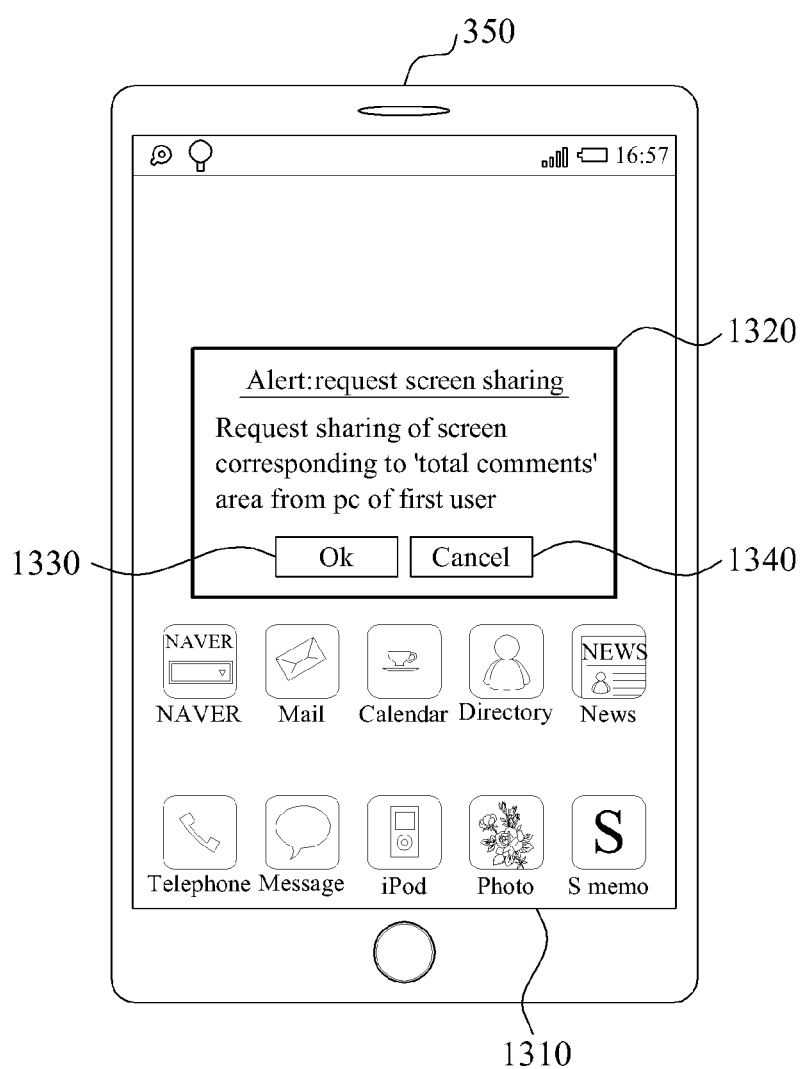
FIG. 13 is a diagram illustrating a screen for receiving an input for approval by a user for a request for movement of a web object according to an embodiment of the present invention.

FIG. 13 is a diagram illustrating a screen for receiving an input of approval by the user for the request for movement of the web object according to an embodiment of the present invention.

In operation 820 of FIG. 8, when the transmitting/receiving unit 610 of the secondary device 350 receives the request for movement of the web object, the processing unit 620 may display a window 1320 on a screen 1310 of the secondary device 350 to display the request for movement of the web object.

A message indicating that the request for movement of the web object is received from the primary device 320 may be outputted in the window 1320. In FIG. 13, the request for movement of the web object may be provided as a request for sharing of a display corresponding to an area of the web object. The primary device 320 may correspond to a personal computer (PC) of a first user.

The window 1320 may include buttons to select an approval or denial by the user for the request for movement of the web object. The window 1320 may include an "OK" button 1330 and a "cancel" button 1340.

When the "OK" button 1330 is clicked or touched by the user, the operation 825 of FIG. 8 may be performed. When the "cancel" button 1340 is clicked or touched by the user, the method of processing the web object to be moved to the secondary device 350 according to FIG. 8 may be cancelled.

Figure 14:
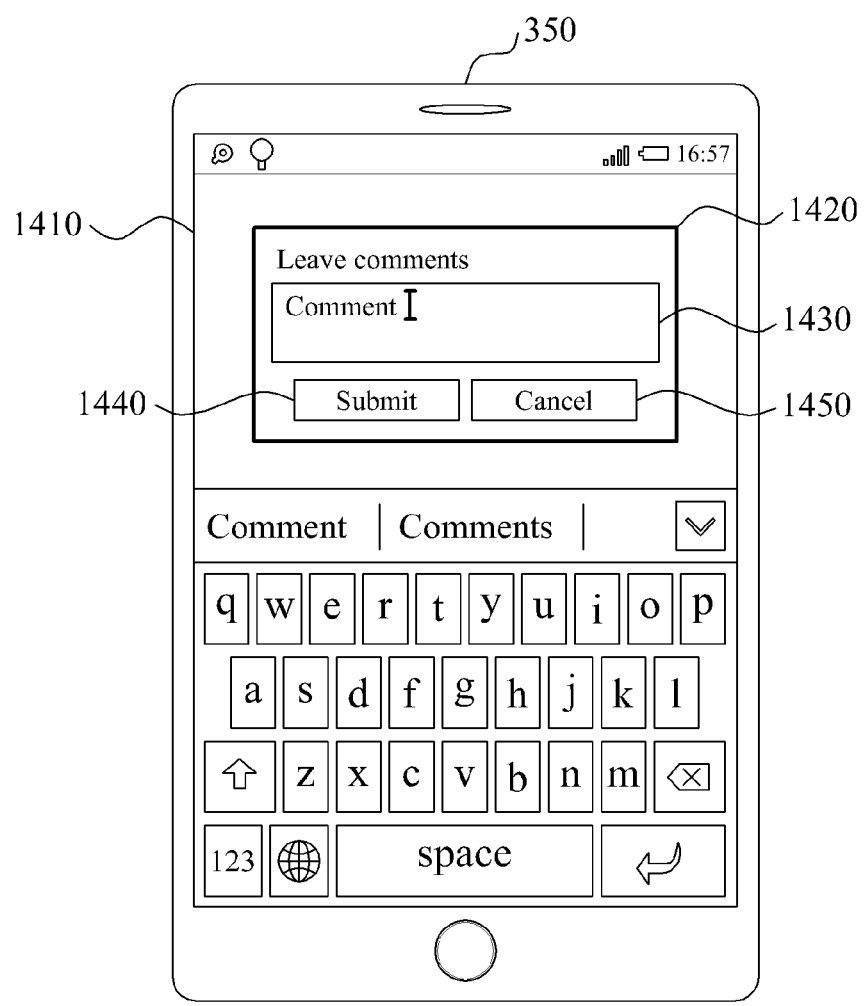
FIG. 14 is a diagram illustrating an example of a screen for manipulating a web object moved to a secondary device.

FIG. 14 is a diagram illustrating an example of a screen for manipulating a web object 1420 moved to the secondary device 350.

In FIG. 14, the moved web object 1420 may be displayed on a screen 1410 of the secondary device 350. The moved web object 1420 may correspond to the third object 930 of FIG. 9. The moved web object 1420 may include an input window 1430, a "submit" button 1440, and a "cancel" button 1450. Each of the input window 1430, the "submit" button 1440, and the "cancel" button 1450 may correspond to a function, operation, function or method provided by the moved web object 1420.

In operation 870 of FIG. 8, the user may manipulate the moved web object 1420. For example, the user may input comments on a web service in the input window 1430. The user may use a function provided by the web object 1420 by pressing the "submit" button 1440 and the "cancel" button 1450. When the user presses the "submit" button 1440, the processing unit 620 of the secondary device 350 may transmit the comments inputted in the input window 1430 to the transmitting/receiving unit 410 of the web server 310 or the transmitting/receiving unit 510 of the primary device 320 through the transmitting/receiving unit 610. When the user presses the "cancel" button 1450, the processing unit 620 of the secondary device 350 may transmit information indicating an input of comments is cancelled to the transmitting/receiving unit 410 of the web server 310 or the transmitting/receiving unit 510 of the primary device 320 through the transmitting/receiving unit 610.

Figure 15:
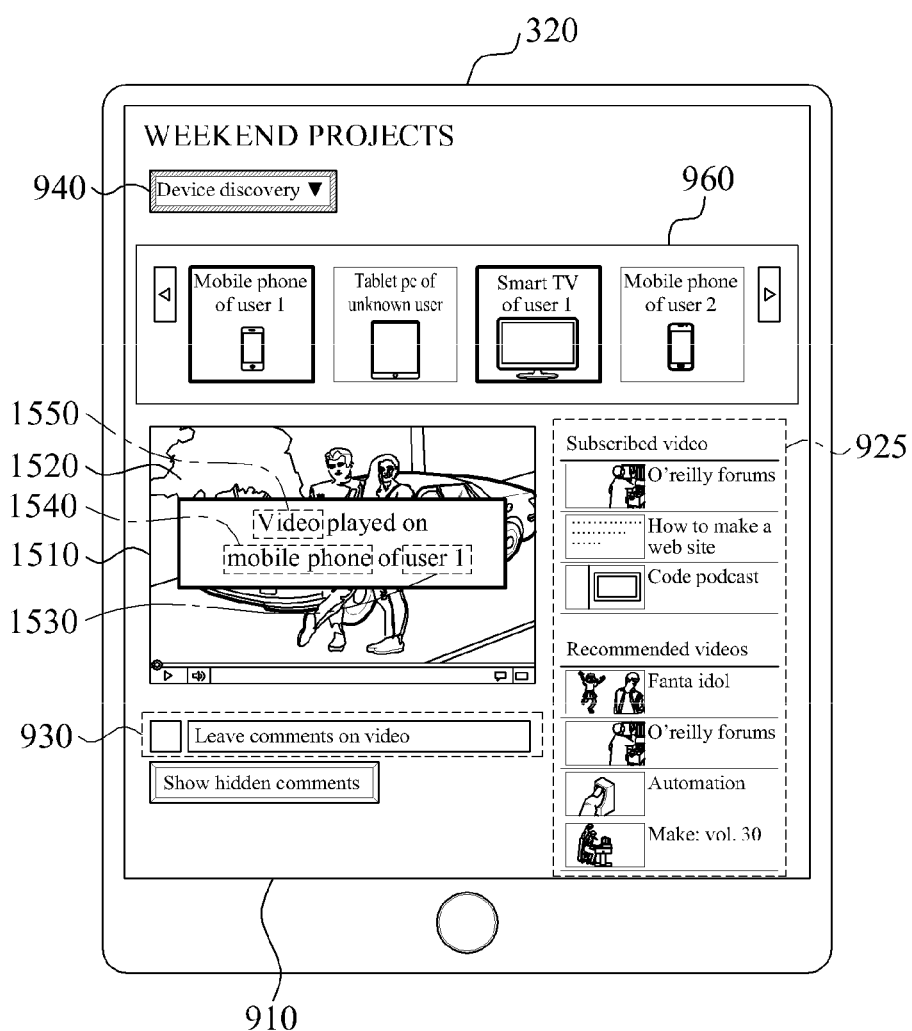
FIG. 15 is a diagram illustrating an example of a web page rendered after movement of a web object.

FIG. 15 is a diagram illustrating an example of the web page rendered after movement of the web object.

In FIG. 15, an alternative image 1510 may be provided after the web object is moved to the secondary device 350. The image 1510 may include a captured image 1520 of the web object, a user name 1530 of the secondary device 350, a type name 1540 of the web object, a title 1550 of the secondary device 350.

After the web page is loaded in operation 710 of FIG. 7, the loaded web page may be rendered in the web browser in operation 718 of FIG. 7.

When the web object is simply deleted from the web page and re-rendered in the web browser after the web object is moved to the secondary device 350, an issue associated with the full layout of the web page may be present since an area occupied by the web object becomes unavailable. Accordingly, as described in operation 760, the processing unit 520 may re-render the web page in the web browser, aside from the web object supporting movability while maintaining the full layout of the web page.

In operation 760, for re-rendering, the processing unit 520 may maintain the full layout of the web page by substituting the image 1510 for an area of the web object supporting movability. An area of the image 1510 on the web page may correspond to an area occupied by the web object in advance of the web object being moved.

A method of substituting the image 1510 for the area of the web object supporting movability is described in further detail with reference to FIG. 16.

Figure 16:
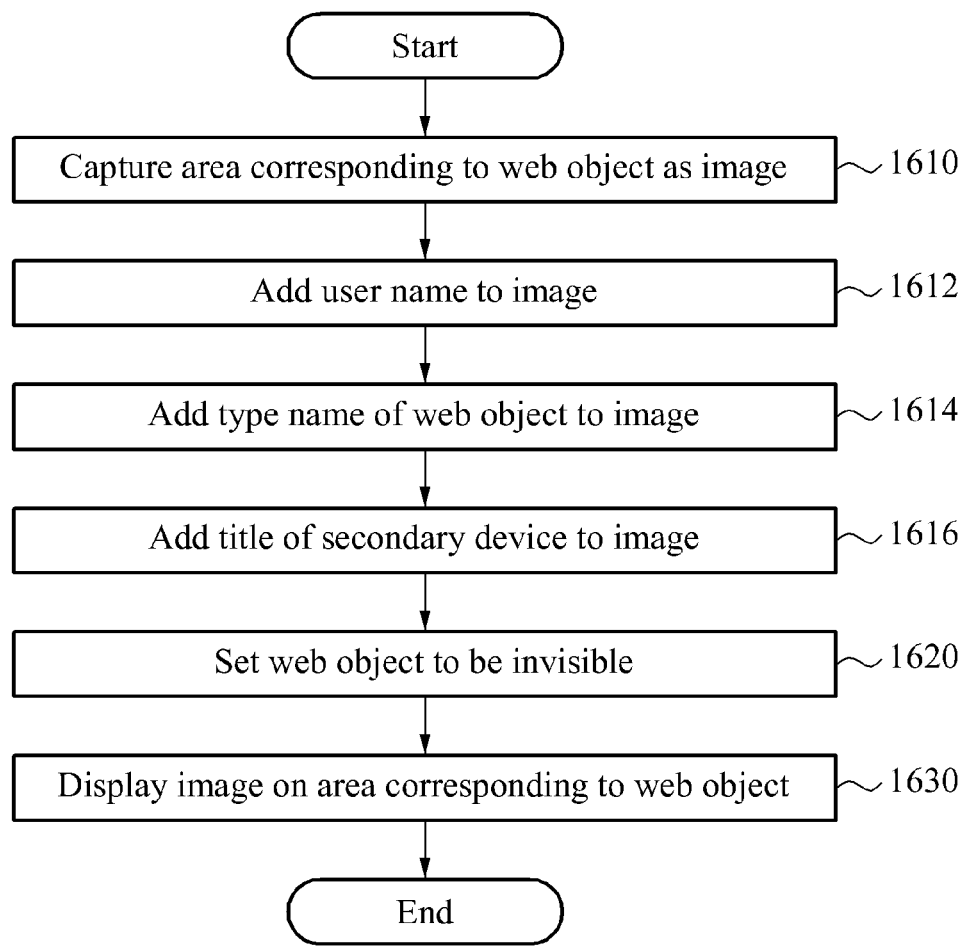
FIG. 16 is a flowchart illustrating a method of rendering a web page after movement of a web object according to an embodiment of the present invention.

FIG. 16 is a flowchart illustrating a method of rendering the web page after movement of the web object according to an embodiment of the present invention.

The operation 760 of FIG. 7 may include operations 1610 through 1630.

In operation 1610, the processing unit 520 of the primary device 320 may capture the area corresponding to the web object as the image 1510.

In operation 1612, the processing unit 520 of the primary device 320 may add the user name 1530 of the secondary device 350 to the image 1510.

In operation 1614, the processing unit 520 of the primary device 320 may add the type name 1540 of the web object to the image 1510.

In operation 1616, the processing unit 520 of the primary device 320 may add the title 1550 of the secondary device 350 to the image 1510.

In operation 1620, the processing unit 520 of the primary device 320 may set the web object to be invisible in the web browser. The processing unit 520 of the primary device 320 may set the web object to be invisible in the web browser by setting a visibility style value of the web object to hidden.

In operation 1630, the processing unit 520 of the primary device 320 may display the image 1510 on the area corresponding to the web object. Here, the area corresponding to the web object may correspond to a part which content of the web object occupies in the web browser.

Figure 17:
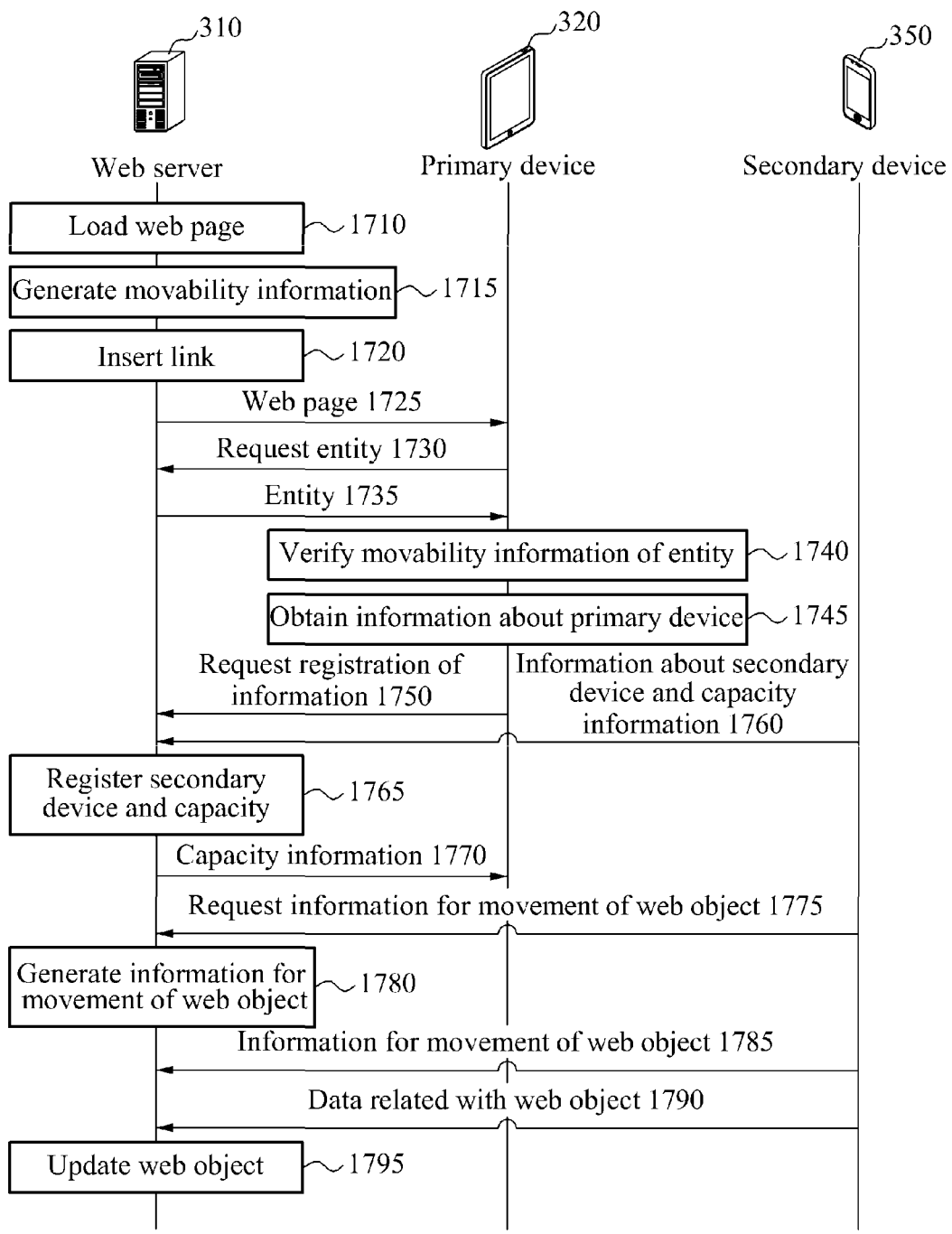
FIG. 17 is a flowchart illustrating a method of processing movement of a web object by a web server according to an embodiment of the present invention.

FIG. 17 is a flowchart illustrating a method of processing the movement of the web object by the web server 310 according to an embodiment of the present invention.

The web server 310 may perform functions of the movability registration server 330 and the notification server 340. The operations performed by the movability registration server 330 and the notification server 340 in FIGS. 7, 8, and 10 may be performed by the web server 310.

In operation 710 of FIG. 7 may include operations 1710 through 1735 described below. For example, operation 710 may be replaced with operations 1710 through 1735.

In operation 1710, the processing unit 420 of the web server 310 may load the web page from the storage unit 430.

In operation 1715, the processing unit 420 of the web server 310 may generate movability information of the web object supporting movability among web objects on the web page. The movability information may be generated in a type of a script file. The movability information may include a movability tag and an intent tag. The script file may include information necessary to obtain information about the primary device 320, for example, an address of the web server 310 and an address of the movability registration server 330.

In operation 1720, the processing unit 420 of the web server 310 may insert a link indicating movability information of the web object supporting movability in a header of the web page. The link may indicate a script file in the web server 310.

In operation 1725, the transmitting/receiving unit 410 of the web server 310 may transmit the web page including the link to the transmitting/receiving unit 510 of the primary device 320. The processing unit 520 of the primary device 320 may load the web page including the link through the transmitting/receiving unit 510.

In operation 1730, the transmitting/receiving unit 510 of the primary device 320 may transmit a request for an entity in the web server 310 indicated by the link to the transmitting/receiving unit 410 of the web server 310. Here, the entity may correspond to a file or script including movability information of the web object.

In operation 1735, the transmitting/receiving unit 410 of the web server 310 may transmit the requested entity to the transmitting/receiving unit 510 of the primary device 320.

Through operations 1730 and 1735, the processing unit 520 of the primary device 320 may obtain movability information of the web object by additionally loading the entity indicated by the link.

In operation 1740, the processing unit 520 of the primary device 320 may verify whether the entity represents movability information of the web object. When the entity fails to represent movability information of the web object, the processing unit 520 may process the entity as a script or file unrelated to the movability information.

In operation 1745, the processing unit 520 of the primary device 320 may obtain information about the primary device 320. Here, the information about the primary device 320 may include at least one of an ID of a web service provided by the web server 310, an IP address of the primary device 320, and an IP address of the secondary device 350.

In operation 1750, the transmitting/receiving unit 510 of the primary device 320 may transmit a request for registration of movability support information of the identified web object and information about the primary device 320 to the transmitting/receiving unit 410 of the web server 310. The processing unit 420 of the web server 310 may register at least one of the movability support information of the identified web object and the information about the primary device 320 transmitted from the primary device 320. The operation 1750 may correspond to operation 730 of FIG. 7.

The operations 1740, 1745, and 1750 may be performed by the entity indicated by the link. For example, the script file may correspond to a script library for performing an intent function on the web page. The processing unit 520 of the primary device 320 may perform the operations 1740, 1745, and 1750 by executing the script library. In the script library, A function for verifying whether the entity represents movability information of the web object, a function for obtaining information about the web server 310, and a function for obtaining information about the primary device 320 may be written.

In operation 1760, the transmitting/receiving unit 410 of the web server 310 may receive information about the secondary device 350 and capacity information of the secondary device 350 from the transmitting/receiving unit 610 of the secondary device 350. The operation 1760 may correspond to operation 812 of FIG. 8.

In operation 1765, the processing unit 420 of the web server 310 may register the secondary device 350 and capacity of the secondary device 350 based on the received information about the secondary device 350 and the received capacity information of the secondary device 350. The operation 1765 may correspond to operation 814 of FIG. 8.

In operation 1770, the transmitting/receiving unit 410 of the web server 310 may transmit capacity information of each of the registered devices or capacity information of the secondary device 350 to the transmitting/receiving unit 510 of the primary device 320. The operation 1770 may correspond to operation 1040 of FIG. 10.

In operation 1775, the transmitting/receiving unit 410 of the web server 310 may receive a request for information for movement of the web object from the transmitting/receiving unit 610 of the secondary device 350. The operation 1775 may correspond to operation 830 of FIG. 8.

In operation 1780, the processing unit 420 of the web server 310 may generate information for movement of the web object. Here, the information for movement of the web object may include information about the web object. Also, the information for movement of the web object may include a web page including the web object. The operation 1780 may correspond to operation 832 of FIG. 8.

In operation 1785, the transmitting/receiving unit 410 of the web server 310 may transmit the information for movement of the web object to the transmitting/receiving unit 610 of the secondary device 350. The operation 1785 may correspond to operation 840 of FIG. 8.

In operation 1790, the transmitting/receiving unit 410 of the web server 310 may receive data related to the web object from the transmitting/receiving unit 610 of the secondary device 350. The operation 1790 may correspond to operation 870 of FIG. 8.

In operation 1795, the processing unit 420 of the web server 310 may update the web object based on the data related with the web object. The web server 310 may update the web object based on the data related with the web object. For example, when the web object corresponds to the third object 930 of FIG. 9 and the data related with the web object corresponds to comments on the web service, the processing unit 420 may add the comments to the web page. When operation 710 is performed iteratively, the transmitting/receiving unit 410 of the web server 310 may transmit the updated web page to the transmitting/receiving unit 510 of the primary device 320.

FIG. 18 is a diagram illustrating a code used for invoking an intent illustrating according to an embodiment of the present invention.

As described in the foregoing, the primary device 320 may move the web object to the secondary device 350 by invoking the intent provided by the secondary device 350.

The code of FIG. 18 may be an example of a code used for invoking the intent.

A first line 1810 may indicate a generated intent object assigned to a variable "intent".

A second line 1820 may indicate an action of the generated intent object, "http://webintents.org/edit". In FIG. 18, the intent action may correspond to an "edit" action in "http://webintent.org". The intent action may include "share", "view", "pick", "subscribe", and "save", as well as "edit".

A third line 1830 may indicate a type of the object on which the action is to be taken. In FIG. 18, the intent action may correspond to edit of the web object of which type is "html5 edit".

A fourth line 1840 may indicate a point in which the action is to be loaded. In FIG. 18, the action may be taken at "http://kaisqure.kaist.ac.kr/pages/commentBox.php?cid=c1234&textBoxType-multipleLine".

The secondary device 350 may edit the object "webObject/html5" at "http://kaisqure.kai st.ac.kr/pages/commentBox.php?cid=c1234&textBoxType-multipleLine".

A fifth line 1850 may indicate a code for invoking the generated intent.

FIG. 19 is a diagram illustrating a code 1900 used for registering the intent according to an embodiment of the present invention.

In FIG. 19, "<intent" and "/>" may indicate a start and an end of the code 1900 used for registering the intent, respectively. "<intent" and "/>" may indicate a start and an end of an intent tag for registering the intent, respectively. The intent tag may correspond to a character string from "<intent" to "/>".

The web page provided by the web server 310 may declaratively mark itself as providing a handling functionality for particular intent actions and types using the "<intent>" tag.

In FIG. 19, "action", "type", "href", "title", and "disposition" may each correspond to a document object model (DOM) string type attribute.

In a first line 1910, the action attribute may specify a character string indicating a behavior class supported by a service. The character string may correspond to an opaque character string.

A value of the action attribute may specify an URI or URL to which an action is passed. For example, the value of the action attribute may specify an application of the secondary device 350 to be launched when the intent is invoked.

In a second line 1920, the type attribute may be a string which specifies a type of payload data of the intent. A value of the type attribute may specify one of the html5 tags.

The type attribute may specify a list of specifiers separated by a space. When the type specifiers are parsed as a multipurpose internet mail extensions (MIME) type or a MIME wildcard type, such as, for example, "*/*" or "*", the type specifiers may be interpreted as the MIME type or the MIME wildcard type. When the type specifiers fail to be parsed as a MIME type and a MIME wildcard type, the type specifiers may be interpreted as a character string literal type specifier. In FIG. 19, the value of the type attribute may be text.

In a third line 1930, a value of the href attribute may specify a URI of a service. The value of the href attribute may specify a URI or URL of a source to be loaded when the intent is invoked. The value of the href attribute may specify a fully qualified URI. When the href attribute is absent, the URI of the service may correspond to a URI in which a tag for registering the intent is placed. Here, the URI in which the tag for registering the intent is placed may correspond to a URI of a web page including the intent tag.

In a fourth line 1940, a value of the title attribute may specify a title that can be read by a person selecting a service provided to users. The value of the title attribute may specify a title of a web object that can be read by users. When the title attribute is absent, a page title of a registered service may be used.

In a fifth line 1950, the disposition attribute may allow a service to choose which context of the intent invocation to be opened in. A user device may disallow a value of the disposition attribute to be changed by a web page.

In the disposition attribute, "window" may specify that a service is opened in a new tab or window context of the web browser. In the disposition attribute, "inline" may specify that a user device opens a service in an overlapping manner, in a context related directly to a context of a client page. The disposition attribute may not be an essential attribute. When the disposition attribute is absent, a "window" value may be applied as a default.

FIG. 20 is a diagram illustrating a page displaying information about the primary device 320 according to an embodiment of the present invention.

In operation 730 of FIG. 7, movability information of the identified web object and information about the primary device 320 may be generated as an extensible markup language (XML) document 2000.

The XML document 2000 may be an example of a file including information about the primary device 320 and movability information of the identified web object. That is, in operation 730, the processing unit 520 of the primary device 320 may generate the XML document 2000 representing movability information of the identified web object and information about the primary device 320. The transmitting/receiving unit 510 of the primary device 320 may transmit the generated XML document 2000 to the movability registration server 330 or the transmitting/receiving unit 410 of the web server 310.

The XML document 2000 may include type information of the primary device 320 as the information about the primary device 320. Also, the XML document 2000 may include intent registration information 2020 as the movability information of the identified web object. The intent registration information 2020 is described in further detail with reference to FIG. 19. The intent registration information 2020 may be plural.

Also, the XML document 2000 may include information indicating an XML name space and information indicating a version of XML specification.

Figure 21:
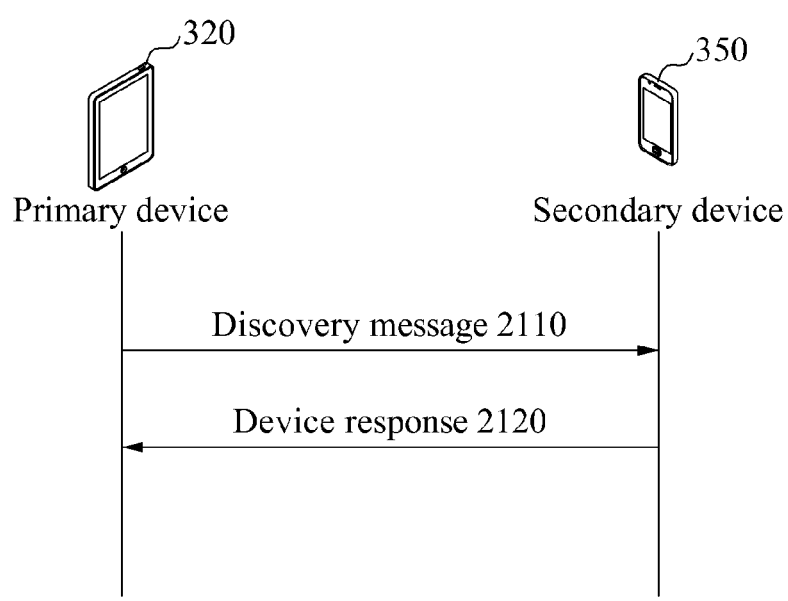
FIG. 21 is a flowchart illustrating a method of discovering a secondary device according to an embodiment of the present invention.

FIG. 21 is a flowchart illustrating a method of discovering the secondary device 350 according to an embodiment of the present invention.

The method of moving the web object from the primary device 320 according to FIG. 7 may include operations 2110 and 2120 described below. For example, the operations 2110 and 2120 may be performed after operation 735 of FIG. 7 or before operation 750 of FIG. 7.

The method of discovering the secondary device 350 may be performed in place of operation 1010 of FIG. 10. That is, the primary device 320 may search for the secondary device 350 directly rather than receiving the list of registered devices 960.

In operations 2110 and 2120, the secondary device 350 may be replaced with an application server.

In operation 2110, the transmitting/receiving unit 510 of the primary device 320 may transmit a discovery message to the transmitting/receiving unit 610 of the secondary device 350. The transmitting may be executed through broadcasting.

The code of Table 1 may be an example of the discovery message.

TABLE 1

[Discovery Message]

D-SEARCH * HTTP/1.1
Host:192.168.126.3:2460
UDD:urn:schemas-kaist-org:device:WebIntents:1
LDD:discover
MaxRetry:3

In operation 2120, when the secondary device 350 receives the discovery message, the transmitting/receiving unit 610 of the secondary device 350 may transmit a device response to the discovery message to the transmitting/receiving unit 510 of the primary device 320.

The code of Table 2 may be an example of the device response.

TABLE 2

[Device Response]

HTTP/1.1 200 OK
UDD:urn:schemas-kaist-org:device:WebIntents:1
Host:192.168.126.3:2460
LDD:urn:http://mnlab.kaist.ac.kr/userID/
dke00988-slk48wej-3jfna-87329::urn:schemas-
kaist-org:device:WebIntents:1
SERVER: Windows NT/5.0
LOCATION:http:179.143.248.17/5432/
Content-Length: 0

The secondary device 350 receiving the discovery message and transmitting the device response in operations 2110 and 2120 may be plural. The list of registered devices 960 may include discovery messages transmitted from the plurality of secondary devices 350 or some of the discovery messages.

FIG. 22 is a diagram illustrating a page displaying capacity of the secondary device 350 according to an embodiment of the present invention.

In operation 1040 of FIG. 10, capacity information of the secondary device 350 may be generated as an XML document 2200. The XML document 2200 may represent a description of a web intent device describing capacity of the web intent device.

The XML document 2200 may be an example of a file including information about the secondary device 350 and capacity information of the secondary device 350.

In operation 1042, the processing unit 620 of the secondary device 350 may generate the XML document 220 representing, for example, information about the secondary device 350 and capacity of the secondary device 350. The transmitting/receiving unit 610 of the secondary device 350 may transmit the generated XML document 2200 to the transmitting/receiving unit 510 of the primary device 320.

The XML document 2200 may include at least one of a universal description 2210 of the secondary device 350, a name 2220 of the secondary device 350, a type 2230 of the secondary device 350, and an intent 2240 supported by the secondary device 350. The intent 2240 supported by the secondary device 350 may be plural.

Also, the XML document 2200 may include information indicating an XML name space and information indicating a version of XML specification.

Figure 23:
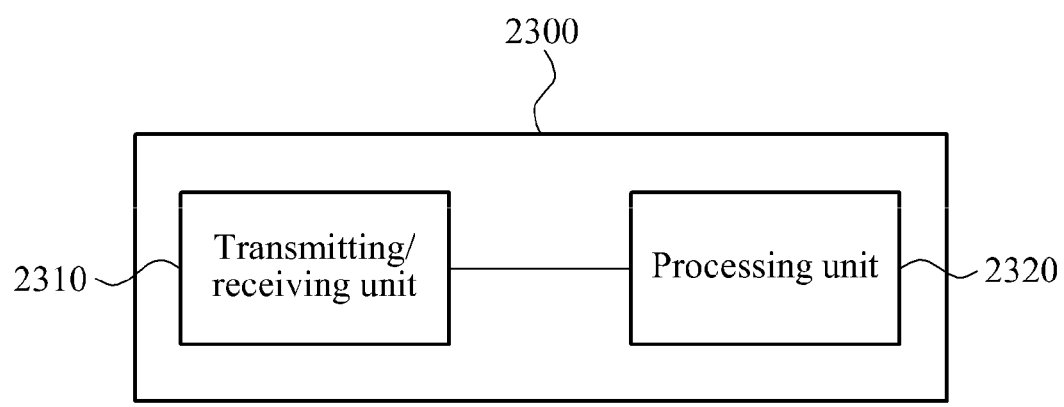
FIG. 23 is a block diagram illustrating a push server according to an embodiment of the present invention.

FIG. 23 is a block diagram illustrating a push server 2300 according to an embodiment of the present invention.

The push server 2300 may include a transmitting/receiving unit 2310 and a processing unit 2320.

The transmitting/receiving unit 2310 may include a hardware module, for example, a network interface card, a network interface chip, a network interface port, and the like, and a software module, for example, a network device driver, a networking program, and the like. The transmitting/receiving unit 2310 may receive information or data transmitted to the push server 2300, and may transmit information or data to be transmitted by the push server 2300. Also, the transmitting/receiving unit 410 may receive a signal or information inputted by a user.

The processing unit 2320 may include at least one processor and at least one core in a processor. The processing unit 2320 may perform an operation necessary to operate the push server 2300.

Figure 24:
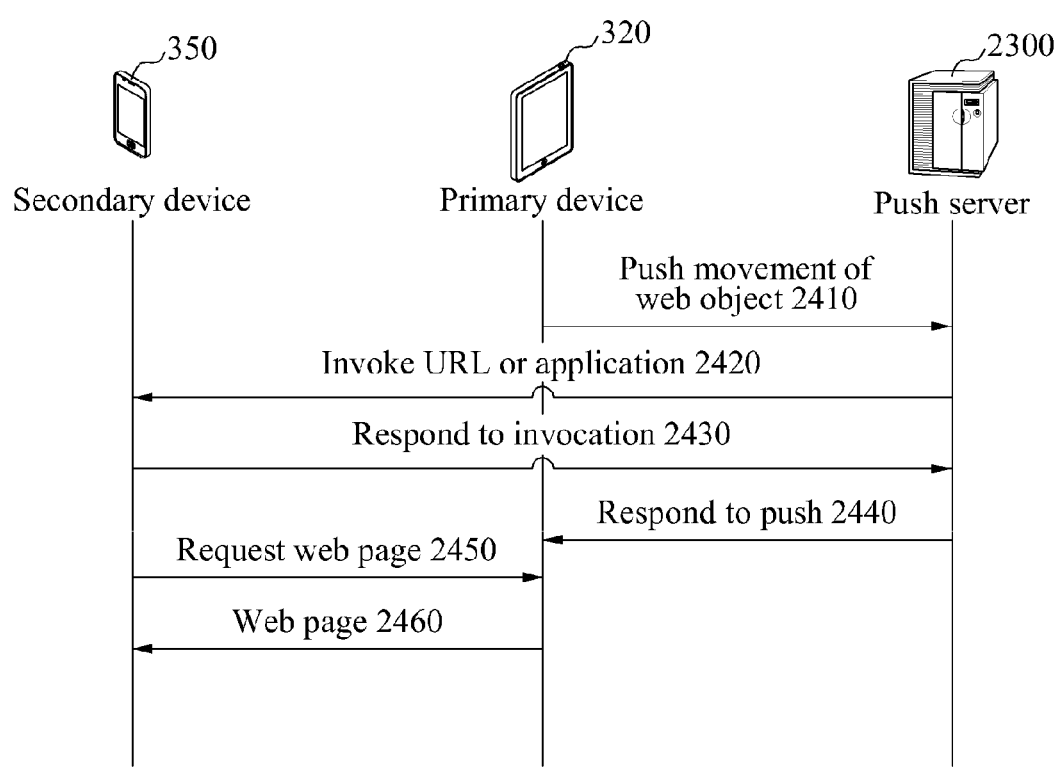
FIG. 24 is a signal flow diagram illustrating a method of moving a web object using a push server from a primary device according to an embodiment of the present invention.

FIG. 24 is a signal flow diagram illustrating a method of moving the web object using the push server 2300 from the primary device 320 according to an embodiment of the present invention.

The operation 750 of FIG. 7 may be replaced with operations 2410 through 2460 described below. The request for movement of the web object may be executed using the push server 2300 rather than the notification server 340. The operations 2410 through 2460 may be integrated into the method of moving the web object from the primary device 320 according to FIG. 7.

In operation 2410, when the identified web object can be moved to the secondary device 350 through the transmitting/receiving unit 510, the processing unit 520 of the primary device 320 may push, to the push server 2300, movement of the web object to the secondary device 350. The transmitting/receiving unit 2310 of the push server 2300 may receive the push for movement of the web object to the secondary device 350.

When the identified web object is plural, the web object selected from the plurality of identified web object in operation 1230 of FIG. 12 may be recognized. In operation 2410, the processing unit 520 of the primary device 320 may push the request for movement of the selected web object to the secondary device 350 among the plurality of identified web objects.

In operation 2420, the processing unit 2320 of the push server 2300 may invoke a URL or an application of the secondary device 350 through the transmitting/receiving unit 2310. The invocation may correspond to invocation of the intent provided by the secondary device 350. That is, the intent provided by the secondary device 350 may be invoked by the push implemented by the push server 2300.

In operation 2430, the transmitting/receiving unit 2310 of the push server 2300 may receive a response to the invocation. That is, the push may include invoking, by the push server 2300, the URL or application of the secondary device 350 and receiving the response to the invocation.

In operation 2440, the transmitting/receiving unit 510 of the primary device 320 may receive the response to the push from the transmitting/receiving unit 2310 of the push server 2300.

In operation 2450, the transmitting/receiving unit 510 of the primary device 320 may receive a request for the web page from the transmitting/receiving unit 610 of the secondary device 350.

In operation 2460, the transmitting/receiving unit 510 of the primary device 320 may transmit the requested web page to the transmitting/receiving unit 610 of the secondary device 350.

The operations described in the foregoing may represent a computer program code for performing functions of the operations. Each operation may be performed by executing the code of a recording medium in which the program is recorded. Here, a subject to perform each operation may correspond to the web server 310, the primary device 320, the movability registration server 330, the notification server 340, or the secondary device 350. The recording medium may include codes corresponding to the operations performed by a predetermined subject. The subject may perform the operations by executing the codes in the recording medium.

The units described herein may be implemented using hardware components, software components, and combinations thereof. For example, the devices and components described in the exemplary embodiments may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard discs, floppy discs, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of moving a web object from a primary device, the method comprising:
   programming a processor to execute machine-readable instructions, the instructions, when executed, causing the processor to move the object from the primary device by:
   loading a web page;
   identifying a web object supporting movability for moving to other devices among a plurality of web objects on the loaded web page;
   determining whether the identified web object can be moved to a secondary device among the other devices based on movability information of the identified web object and by comparing an action attribute value and a type attribute value of an intent tag of the identified web object to a capacity of the secondary device registered by the secondary device;

transmitting a request for movement of the identified web object to the secondary device when the identified web object can be moved to the secondary device; and moving the identified web object to the secondary device, wherein the primary device and the secondary device correspond to N-screen devices of a web service providing the web page.

2. The method of claim 1, the instructions, when executed, further causing the processor to:

register the movability information of the identified web object and information about the primary device.

3. The method of claim 1, the instructions, when executed, further causing the processor to:

receive information about a list of registered devices;

display the list of registered devices based on the received information about the list of registered devices; and recognize that the secondary device is selected from the displayed list of registered devices.

4. The method of claim 3, wherein the registered devices correspond to devices in which reception of an intent for a web service running on the primary device is registered.

5. The method of claim 3, wherein each of the registered devices provided in the list of registered devices is displayed distinguishably based on whether the web object can be moved to the registered device.

6. The method of claim 1, wherein the identified web object is plural, and the instructions, when executed, further causing the processor to:

recognize a selected web object among a plurality of identified web objects, wherein the transmitting comprises transmitting a request for movement of the selected web object among the plurality of identified web objects to the secondary device.

7. The method of claim 6, the instructions, when executed, further causing the processor to:

display each of the plurality of identified web objects distinguishably based on whether the identified web object can be moved to the secondary device.

8. The method of claim 1, the instructions, when executed, further causing the processor to:

update the web page after the identified web object is moved.

9. The method of claim 1, wherein the request for movement of the identified web object to the secondary device includes invoking an intent to the secondary device.

10. The method of claim 1, the instructions, when executed, further causing the processor to:

render the web page in a web browser; and re-render the web page in the web browser, aside from the web object supporting movability, while maintaining a full layout of the web page.

11. The method of claim 10, wherein the re-rendering comprises maintaining the full layout of the web page by substituting an image for an area of the web object supporting movability.

12. The method of claim 10, wherein the re-rendering comprises:

setting the web object invisible in the web browser; and displaying an image on an area corresponding to the web object.

13. A device comprising:

a processing unit, programmed according to a set of machine-executable instructions, which instructions configure the processing unit to load a web page, to identify a web object supporting movability for moving to other devices among a plurality of web objects on the loaded web page, to determine whether the identified web object can be moved to a secondary device among the other devices based on movability information of the identified web object and by comparing an action attribute value and a type attribute value of an intent tag of the identified web object to a capacity of the secondary device registered by the secondary device, and to generate a request for movement of the identified web object to the secondary device when the identified web object can be moved to the secondary device; and a transmitting/receiving unit to receive the web page and to transmit the request for movement of the identified web object to the secondary device, to move the identified web object to the secondary device, wherein the primary device and the secondary device correspond to N-screen devices of a web service providing the web page.

14. A method of moving a web object using a push server from a primary device, the method comprising:

programming a processor to execute machine-readable instructions, the instructions, when executed, causing the processor to move the object from the primary device by:

loading a web page;

identifying a web object supporting movability for moving to other devices among a plurality of web objects on the loaded web page;

determining whether the identified web object can be moved to a secondary device among the other devices based on movability information of the identified web object and by comparing an action attribute value and a type attribute value of an intent tag of the identified web object to a capacity of the secondary device registered by the secondary device;

pushing, to the push server, movement of the web object to the secondary device when the identified web object can be moved to the secondary device; and receiving a response to the push from the push server, wherein the primary device and the secondary device correspond to N-screen devices of a web service providing the web page.

15. The method of claim 12, the instructions, when executed, further causing the processor to:

receive a request for the web page from the secondary device; and transmit the web page to the secondary device.

16. The method of claim 14, wherein the pushing comprises invoking, by the push server, a uniform resource locator (URL) or an application of the secondary device and receiving a response to the invocation.

17. The method of claim 16, wherein the invoking corresponds to invoking an intent provided by the secondary device.

* * * * *